US009139079B2

(12) United States Patent
Suntharalingam et al.

(10) Patent No.: US 9,139,079 B2
(45) Date of Patent: Sep. 22, 2015

(54) INTEGRATED ELECTRO-MECHANICAL POWERTRAIN SYSTEM FOR HYBRID VEHICLES

(71) Applicant: McMaster University, Hamilton (CA)

(72) Inventors: Piranavan Suntharalingam, Hamilton (CA); Ali Emadi, Burlington (CA)

(73) Assignee: McMaster University, Hamilton (CA)

( * ) Notice: Subject to any disclaimer, the term of this patent is extended or adjusted under 35 U.S.C. 154(b) by 93 days.

(21) Appl. No.: 13/850,775

(22) Filed: Mar. 26, 2013

(65) Prior Publication Data

US 2013/0252774 A1 Sep. 26, 2013

Related U.S. Application Data

(60) Provisional application No. 61/615,658, filed on Mar. 26, 2012.

(51) Int. Cl.
| | |
|---|---|
| *F16H 3/72* | (2006.01) |
| *B60K 6/547* | (2007.10) |
| *B60K 6/365* | (2007.10) |
| *B60K 6/387* | (2007.10) |
| *B60K 6/445* | (2007.10) |
| *B60K 6/52* | (2007.10) |
| *B60K 6/38* | (2007.10) |

(52) U.S. Cl.
CPC ............... *B60K 6/547* (2013.01); *B60K 6/365* (2013.01); *B60K 6/387* (2013.01); *B60K 6/445* (2013.01); *B60K 6/52* (2013.01); *B60K 2006/381* (2013.01); *Y02T 10/6239* (2013.01); *Y02T 10/6265* (2013.01); *Y10S 903/902* (2013.01)

(58) Field of Classification Search
CPC .......... B60K 6/547; B60K 6/445; B60K 6/387
USPC .......... 475/5, 4, 248, 150, 149, 330, 220, 225, 475/331; 180/65.22, 65.2, 65.3; 477/4, 9, 5
See application file for complete search history.

(56) References Cited

U.S. PATENT DOCUMENTS

| | | | |
|---|---|---|---|
| 4,405,029 A | 9/1983 | Hunt | |
| 4,533,011 A | 8/1985 | Heidemeyer et al. | |
| 4,862,009 A | 8/1989 | King | |
| 5,713,425 A | 2/1998 | Buschhaus et al. | |
| 5,847,470 A | 12/1998 | Mitchell | |
| 6,041,877 A | 3/2000 | Yamada et al. | |
| 6,053,833 A * | 4/2000 | Masaki | 475/2 |
| 6,227,997 B1 | 5/2001 | Fujisawa et al. | |
| 6,234,930 B1 * | 5/2001 | Kaneko et al. | 475/5 |
| 6,332,257 B1 | 12/2001 | Reed, Jr. et al. | |
| 6,371,878 B1 * | 4/2002 | Bowen | 475/5 |
| 6,533,693 B2 * | 3/2003 | Bowen et al. | 475/5 |

(Continued)

*Primary Examiner* — David J Hlavka
(74) *Attorney, Agent, or Firm* — Bereskin & Parr LLP/S.E.N.C.R.L., s.r.l.

(57) ABSTRACT

A vehicle powertrain system including a differential gear set, a planetary gear set coupled to the differential gear set, an engine coupled to the planetary gear set to transfer power between the engine and the planetary gear set, a first electric machine coupled to the planetary gear set via a first clutch and selectively engagable, via actuation of the first clutch, to transfer power between the first electric machine and the planetary gear set, and a second electric machine coupled to the planetary gear set via a second clutch and selectively engagable, via actuation of the second clutch, to transfer power between the second electric machine and the planetary gear set.

27 Claims, 16 Drawing Sheets

(56) References Cited

U.S. PATENT DOCUMENTS

| | | |
|---|---|---|
| 6,569,055 B2 | 5/2003 | Urasawa et al. |
| 6,579,201 B2 * | 6/2003 | Bowen .................. 475/5 |
| 7,074,151 B2 * | 7/2006 | Thompson ............ 475/225 |
| 7,314,421 B2 * | 1/2008 | Kim ....................... 475/5 |
| 8,011,461 B2 | 9/2011 | Rodriguez et al. |
| 8,506,448 B2 * | 8/2013 | Hokoi .................... 477/3 |
| 8,641,571 B2 * | 2/2014 | Ichikawa et al. ...... 475/170 |
| 8,911,315 B2 * | 12/2014 | Kaltenbach et al. ...... 475/5 |
| 2005/0205313 A1 | 9/2005 | Gilmore et al. |
| 2006/0000650 A1 | 1/2006 | Hughey |
| 2006/0030450 A1 | 2/2006 | Kyle |
| 2007/0249456 A1 * | 10/2007 | Meixner ............... 475/150 |
| 2009/0321156 A1 | 12/2009 | Perkins |
| 2010/0000807 A1 | 1/2010 | Rodriguez et al. |

* cited by examiner

INTEGRATED ELECTRO-MECHANICAL POWERTRAIN SYSTEM FOR HYBRID VEHICLES

CROSS-REFERENCE TO RELATED APPLICATION

This application claims the benefit of U.S. Provisional Application No. 61/615,658 filed Mar. 26, 2012, the entire contents of which are hereby incorporated herein by reference.

FIELD

Embodiments disclosed herein relate generally to vehicle powertrain systems, and more particularly to an integrated electro-mechanical powertrain system for use in electric, hybrid, and plug-in hybrid electric vehicles.

BACKGROUND

Hybrid vehicles (e.g. vehicles with more than one power source for supplying power to move the vehicle) may provide increased efficiency and/or increased fuel economy when compared to vehicles powered by a single internal combustion engine.

In some hybrid vehicles, which may be referred to as parallel hybrids, two or more power sources are operated concurrently (e.g. in parallel) to supply motive power to a conventional drivetrain. In other hybrid vehicles, which may be referred to as series hybrids, an electric machine supplies supply motive power to the drivetrain, and another power source (e.g. an internal combustion engine) can be selectively operated to supply electric power to the electric machine. That is, the internal combustion engine, electric machine, and drivetrain are connected in series.

BRIEF DESCRIPTION OF THE DRAWINGS

For a better understanding of the described embodiments and to show more clearly how they may be carried into effect, reference will now be made, by way of example, to the accompanying drawings in which.

DESCRIPTION OF EXAMPLE EMBODIMENTS

Various apparatuses or methods are described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

In traditional hybrid vehicle powertrains that contain an internal combustion ending and a pair of electric machines, typically one of the electric machines may selectively operate as either an electric motor or as an electric generator. However, the other electric machine typically operates only as an electric generator, for example to recover power during regenerative engine braking.

These and other aspects and features of various embodiments will be described in greater detail below. While the powertrain systems described herein may be particularly useful in a front wheel drive hybrid electric vehicle, the powertrain systems described herein may be implemented in various hybrid electric vehicles, including plug-in hybrid vehicles, and can be implemented in hybrid vehicles having front-wheel drive, rear-wheel drive, four-wheel drive and/or all-wheel drivetrain systems.

Furthermore, the powertrain systems may be scalable, and therefore may be applicable to vehicles including small passenger car, minivans, sports utility vehicles, pickup trucks, vans, buses, and trucks. Other applications may be possible, including off-road vehicles, tractors, mining and construction vehicles, hybrid boats and other naval applications.

Figure 1:
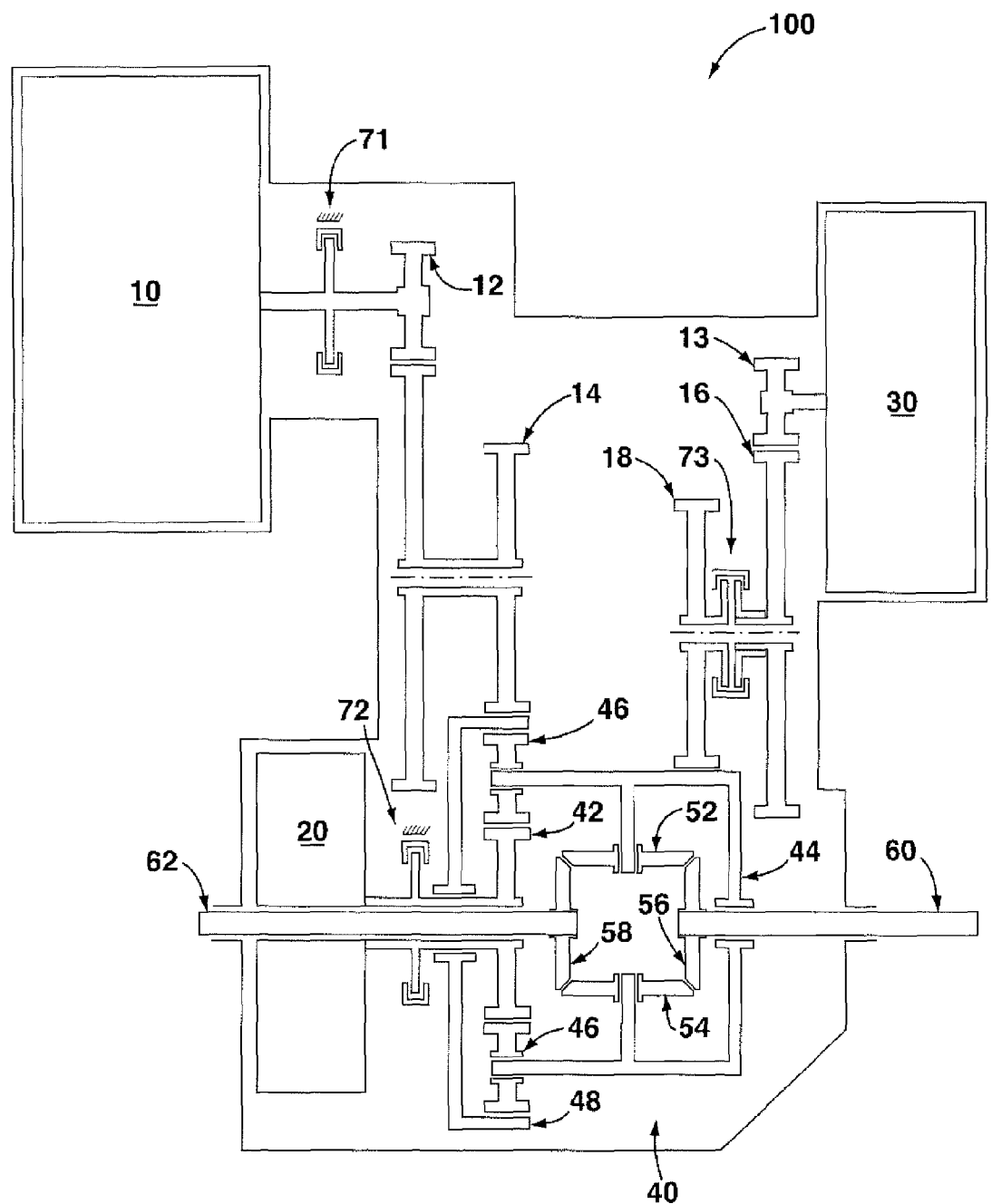
FIG. 1 is a schematic diagram of a vehicle powertrain system in accordance with at least one example embodiment.

Reference is now made to FIG. 1, which illustrates an example embodiment of a vehicle powertrain system 100, which may be used in a front-wheel drive vehicle. Powertrain system 100 includes an internal combustion engine 10, a first electric machine 20, and a second electric machine 30, each independently coupled to a planetary gear set 40. The planetary gear set 40 comprises a sun gear 42, a planetary carrier 44, one or more pinion gears 46, and a ring gear (or wheel gear) 48. Differential pinion gears (which may be referred to as differential idlers) 52, 54 are coupled to planetary carrier 44 and a pair of differential output gears 56, 58. Differential output gears 56, 58 are connected to drive axels 60, 62 for transferring power and/or torque between the differential gear set and the wheels of a vehicle.

In some embodiments, each electric machine 20, 30 may be independently selectively operable as either an electric motor or as an electric generator. When operating as an electric motor, the electric machine is capable of converting electrical energy (from e.g. a battery, a capacitor, or other power source) into mechanical energy to produce an output power (or torque). When operating as an electric generator, the electric machine is capable of converting mechanical energy (from e.g. a shaft or other mechanical input) into electrical energy, which may be transferred to e.g. a battery, a capacitor, or other power source.

In some embodiments, first and second electric machines 20, 30 may take the form of various types of electric machines, including: switch reluctance machines; induction machines; and/or permanent magnet machines.

In the illustrated embodiment, first electric machine 20 is coupled to the sun gear 42 of planetary gear set 40 via a first clutch 72. Depending upon the operating requirement of the powertrain system, first clutch 72 may be selectively actuated to engage first electric machine 20 and sun gear 42 so that power and/or torque may be transferred between the first electric machine and planetary gear set 40, or selectively actuated to disengage first electric machine 20 and sun gear 42 to prevent power and/or torque from being transferred between the first electric machine and the planetary gear set.

By locating electric machine 20 close to the differential gear set, this may allow the total mass and/or rotational inertia of the coupling between the electric machine and the differential, which may lead to increased energy efficiency and/or increased responsiveness of the powertrain system.

As shown, first clutch 72 may be integrated with the shaft connecting first electric machine 20 and sun gear 42. First clutch 72 may be considered to be a static clutch, in that the clutch may be used to ground the first electric machine to achieve the tractive requirements at the differential gear set.

Although it may be possible to electrically lock the first electric machine without using a clutch, depending upon the amount of power currently being transferred through the differential gear set, locking the first electric machine may require a significant amount of electric energy to be dissipated to achieve this. By using first clutch 72 to selectively engage and disengage first electric machine 20 and sun gear 42, energy losses associated with locking the first electric machine may be reduced.

Also, the holding torque capable of being provided an electric machine may vary based on the size and/or power rating of the electric machine. For example, a relatively small electric machine may be capable of operating at a relatively speed, but with a relatively low torque output (e.g. a relatively small electric machine may provide a relatively low holding torque), while a relatively large electric machine may be capable of producing a relatively high torque output (e.g. holding torque), but may operate at a relatively low speed. Also, in some configurations the relative amount of holding torque electric machine 20 is capable of transferring to planetary gear set 40 may affect the acceleration and/or regenerative braking performance of the vehicle when being driven primarily by engine 10 and/or second electric machine 30. By using first clutch 72 to selectively engage and disengage electric machine 20 and sun gear 42, this may allow greater flexibility when selecting an appropriate size and/or power rating for electric machine 20.

Also, use of first clutch 72 may reduce idling of the first electric machine; this may avoid unnecessary energy losses in the powertrain, and/or increase the operating life of bearings within the vehicle powertrain system.

In the illustrated embodiment of FIG. 1, engine 10 is coupled to ring gear 48 of planetary gear set 40 via a reduction gear 14 located between engine output gear 12 and ring gear 48. It will be appreciated that other configurations of reduction gear sets are possible, and that in some embodiments a reduction gear or gear set may not be provided between engine 10 and planetary gear set 40.

Engine 10 is also shown as being coupled to ring gear 48 via an engine clutch 71. Depending upon the operating requirement of the powertrain system, engine clutch 71 may be selectively actuated to engage engine and ring gear 48 so that power and/or torque may be transferred between the engine 10 and planetary gear set 40, or selectively actuated to disengage engine 10 and ring gear 48 to prevent power and/or torque from being transferred between the engine and the planetary gear set.

As shown, engine clutch 71 may be integrated with the shaft connecting engine 10 and engine output gear 12. In some embodiments, engine clutch 71 may be located elsewhere between engine 10 and planetary gear set 40. Engine clutch 71 may be considered to be a static clutch, in that the clutch may be used to ground the engine to achieve the tractive requirements at the differential gear set.

Where engine 10 is an internal combustion engine, it may be possible to lock the engine by controlling the pressure of the cylinders (i.e. without using a clutch). However, the holding torque requirement may vary depending upon the negative torque generated by the drive axles. Also, the range of holding torque capable of being provided by engine 10 may vary based on the power rating of the engine. For example, an engine with a relatively low rated power and/or torque output may be capable of providing a relatively low holding torque. Also, the relative amount of holding torque engine 10 is capable of transferring to planetary gear set 40 may affect the acceleration and/or regenerative braking performance of the vehicle when being driven primarily by first electric machine 20 and/or second electric machine 30. By using engine clutch 71 to selectively engage and disengage engine 10 and ring gear 48, this performance deterioration may be avoided.

Also, use of engine clutch 71 may reduce the idling of engine 10; this may avoid unnecessary energy losses in the powertrain, and/or increase the operating life of bearings within the vehicle powertrain system.

In the illustrated embodiment of FIG. 1, second electric machine 30 is coupled to planetary gear set 40 via a reduction gear set comprising reduction gears 16, 18 located between second electric machine output gear 13 and planetary carrier 44. It will be appreciated that other configurations of reduction gear sets are possible, and that in some embodiments a reduction gear set may not be provided.

By coupling electric machine 30 to the differential gear set, this may allow the total mass and/or rotational inertia of the coupling between the electric machine and the differential, which may lead to increased energy efficiency and/or increased responsiveness of the powertrain system.

Second electric machine 30 is also shown as being coupled to planetary carrier 44 via a second clutch 73. Depending upon the operating requirement of the powertrain system, second clutch 73 may be selectively actuated to engage second electric machine 30 and planetary carrier 44 so that power and/or torque may be transferred between the second electric machine and planetary gear set 40, or selectively actuated to disengage second electric machine 30 and planetary carrier 44 to prevent power and/or torque from being transferred between the second electric machine and the planetary gear set.

As shown, second clutch 73 may be integrated with a shaft connecting reduction gears 16, 18. In some embodiments, second clutch 73 may be located elsewhere between second electric machine 30 and planetary gear set 40. Second clutch 73 may be considered to be a dynamic clutch, in that the clutch may rotate with one or more of the shafts to which it is mounted, and thus may not be capable of grounding the second electric machine.

Although it may be possible to electrically lock the second electric machine without using a clutch, depending upon the amount of power currently being transferred through the differential gear set, locking the second electric machine may require a significant amount of electric energy to be dissipated to achieve this. By using second clutch 73 to selectively engage and disengage second electric machine 30 and planetary carrier 44, energy losses associated with locking the second electric machine may be reduced. Also, use of second clutch 73 may reduce idling of the second electric machine and/or one or more reduction gears (e.g. reduction gear 18); this may avoid unnecessary energy losses in the powertrain, and/or increase the operating life of bearings within the vehicle powertrain system.

Also, as noted above, the holding torque capable of being provided an electric machine may be proportional to the rated power and/or operating speed of the electric machine. Also, in some configurations the relative amount of holding torque electric machine 30 is capable of transferring to planetary gear set 40 may affect its ability to act as a torque coupler, which may affect the acceleration and/or regenerative braking performance of the vehicle when being driven primarily by engine 10 and/or first electric machine 20. By using second clutch 73 to selectively engage and disengage electric machine 30 and planetary carrier 44, this may allow greater flexibility when selecting an appropriate size and/or power rating for electric machine 30.

In some embodiments, one or more of clutches 71, 72, 73 may be electro-mechanically actuated. It will be appreciated that, depending on the configuration of an electro-magnetic clutch, applying or removing a voltage to actuate the clutch may result in engagement or disengagement of the shafts to which the clutch is coupled. For example, an electro-magnetic clutch may be configured such that applying a voltage to actuate (or 'engage') the clutch may disengage the two shafts connected to the clutch to prevent power and/or torque from being transferred between the shafts. Conversely, actuating the clutch by removing (or not applying) a voltage to 'disengage' the clutch may result in engagement of the two shafts connected to the clutch to allow power and/or torque to be transferred between the shafts. Put another way, 'engaging' the clutch may disengage the shafts connected by the clutch, and vice versa. However, in other arrangements an electro-magnetic clutch may be configured such that 'engaging' the clutch by applying a voltage to the clutch may engage the two shafts connected to the clutch, and 'disengaging' the clutch by removing (or not applying) a voltage may result in disengagement of the two shafts connected to the clutch.

In some embodiments, clutches 71, 72, 73 may be hydraulically, mechanically and/or pneumatically actuated.

As will be appreciated, the vehicle powertrain system 100 shown in FIG. 1 provides three independent inputs at the differential gear set to transfer power and/or torque between the wheels of a vehicle and three independently operable power sources (e.g. engine 10, first electric machine 20, and second electric machine 30). The system also enables each of the three power sources to be independently operated so as to better meet various driving requirements and/or conditions.

Also, by selectively actuating one or more clutches 71, 72, and 73, and by selectively operating electric machine 20 and/or electric machine 30 as an electric motor or an electric generator, vehicle powertrain system 100 may be selectively configured to operate in a number of different modes of operation, which will be described with reference to FIGS. 2-10.

Figure 2:
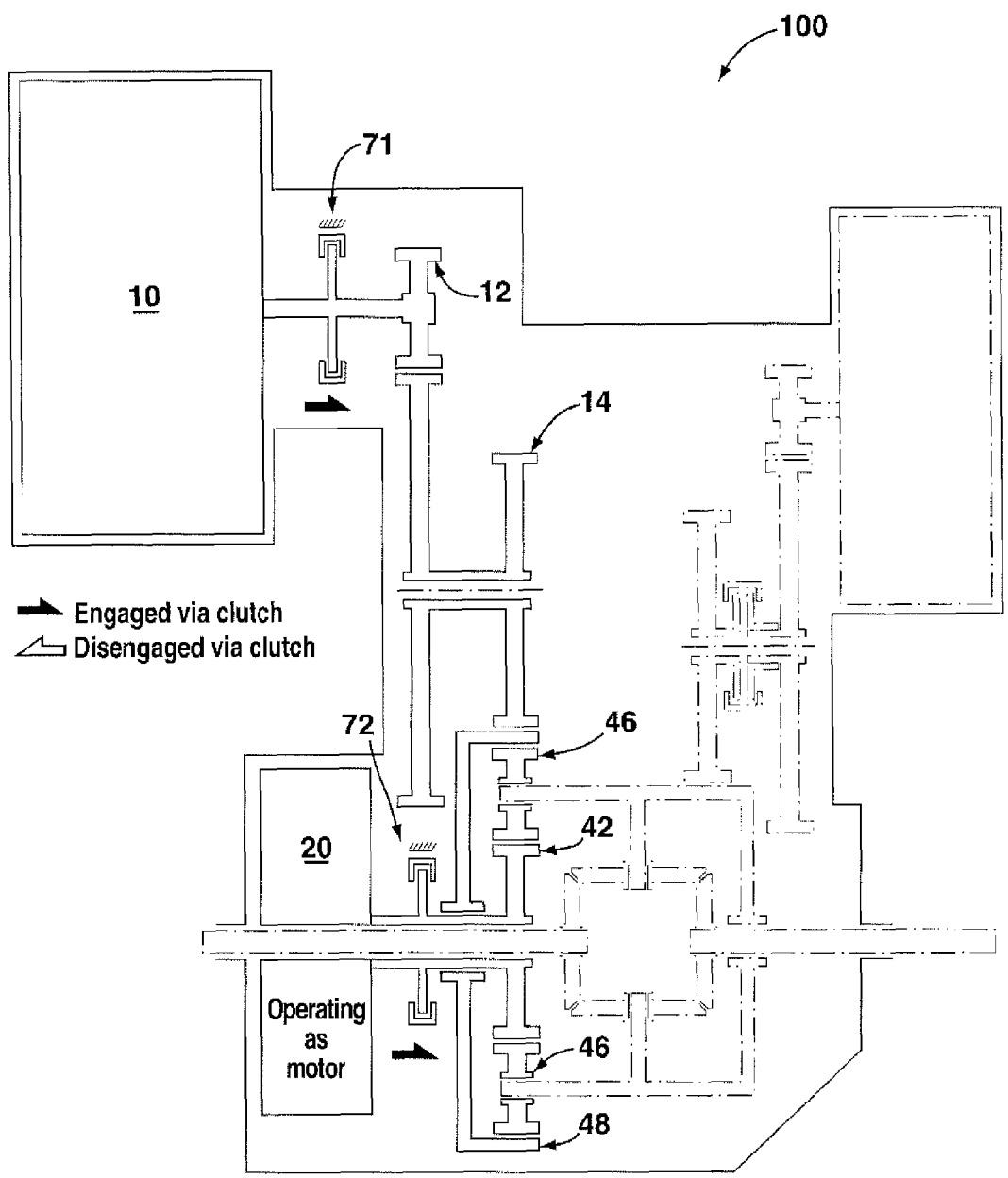
FIG. 2 is a schematic diagram showing the vehicle powertrain system of FIG. 1 configured to operate in one mode of operation.

Turning to FIG. 2, vehicle powertrain system 100 is shown as being configured in an internal combustion engine starting ("ICES") mode of operation, wherein electric machine 20 acts as an integrated starter motor to energize engine 10. In this ICES mode, engine clutch 71 is actuated to engage engine 10 and ring gear 48, first clutch 72 is actuated to engage electric machine 20 and sun gear 42, and electric machine 20 is selected to operate as an electric motor. (Since there is no output power at the differential gear set, second clutch 73 can be either engaged or released). In this configuration, output power and/or torque from electric machine 20 may be may be transferred to engine 20 via the planetary gear set. More specifically, power will be transferred from electric machine 20 to engine 10 via sun gear 42, one or more pinion gears 46, ring gear 48, reduction gear 14, and engine output gear 12.

Figure 3:
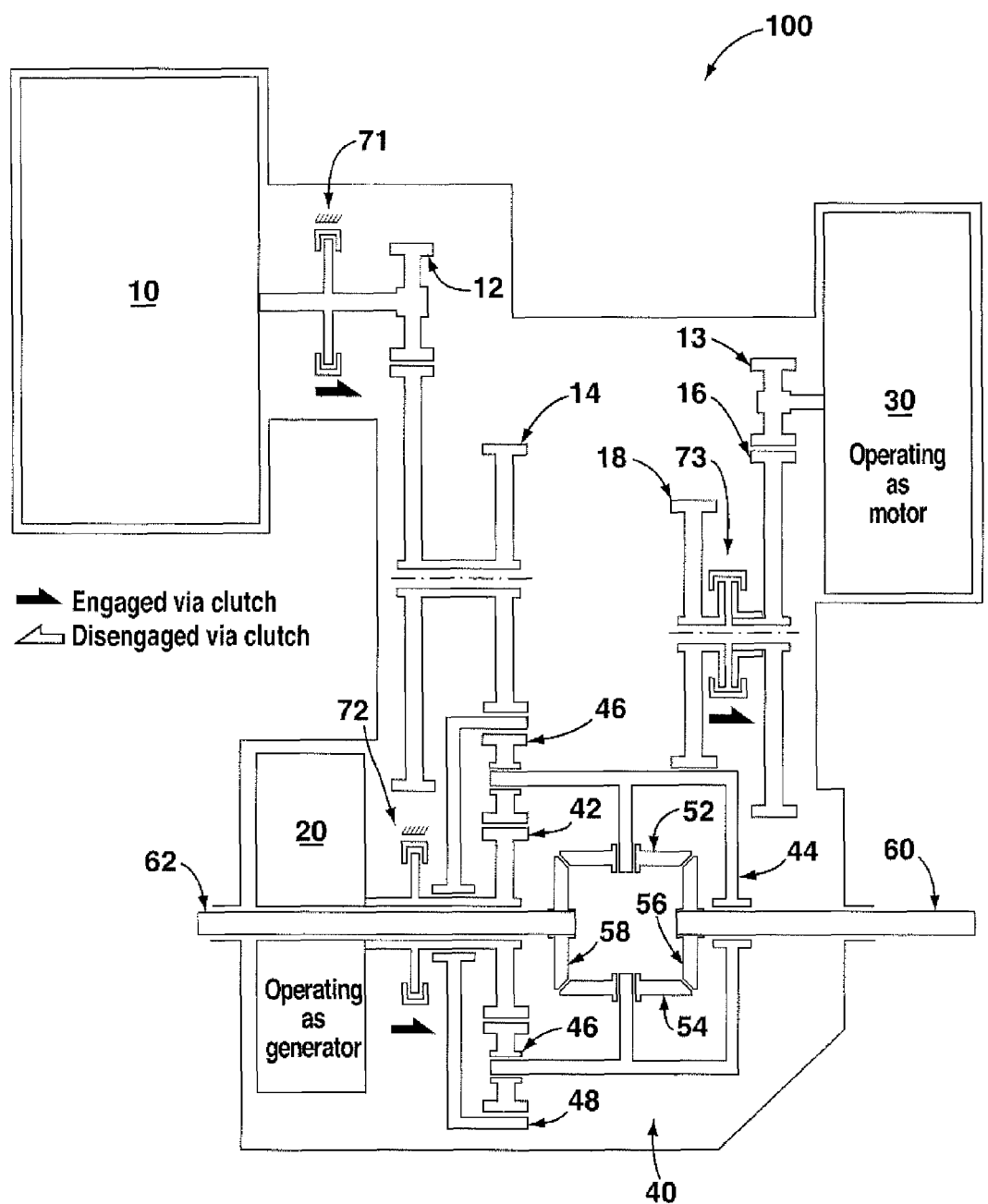
FIG. 3 is a schematic diagram showing the vehicle powertrain system of FIG. 1 configured to operate in one mode of operation.

In FIG. 3, vehicle powertrain system 100 is shown as being configured in a series-parallel hybrid ("SPH") mode of operation. In this SPH mode, engine clutch 71 is actuated to engage engine 10 and ring gear 48, first clutch 72 is actuated to engage electric machine 20 and sun gear 42, and second clutch 73 is actuated to engage electric machine 30 and planetary carrier 44. Electric machine 20 is selected to operate as an electric generator, and electric machine 30 is selected to operate as an electric motor. In this configuration, a fraction of the power and/or torque output by engine 10 may be transferred to electric machine 20, power and/or torque generated by electric machine 20 may be electrically transferred to electric machine 30, and the accumulated tractive power of the planetary gear set will be transferred to the drive wheels via the differential gear set. More specifically: i) power and/or torque will be transferred from engine 10 to planetary carrier 44 via engine output gear 12, reduction gear 14, ring gear 48, and one or more pinion gears 46; ii) power and/or torque will be transferred to electric machine 20 from planetary carrier 44 via one or more pinion gears 46 and sun gear 42; and iii) power and/or torque will be transferred from electric machine 30 to planetary carrier 44 via output gear 13, and reduction gears 16, 18.

Figure 4:
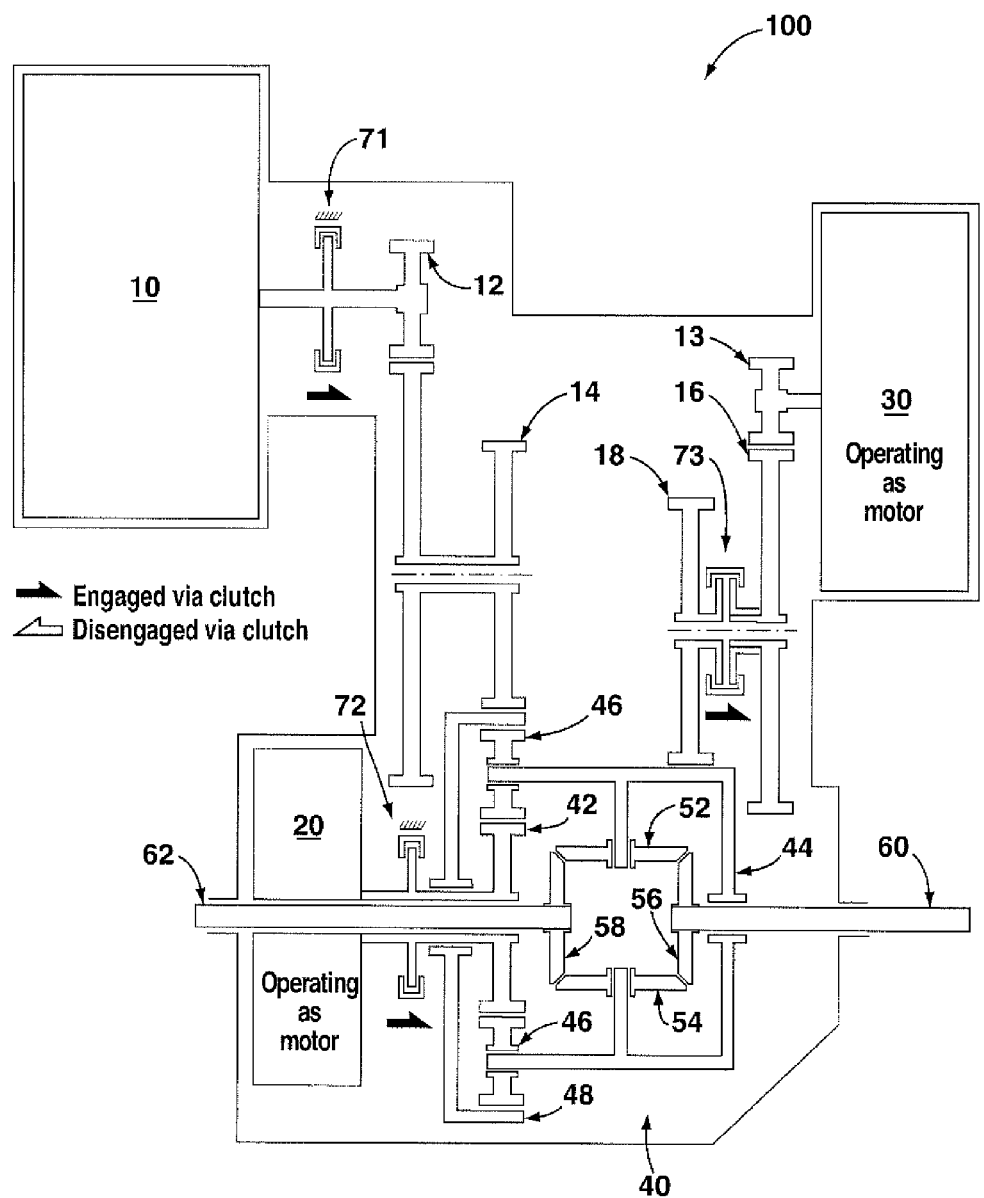
FIG. 4 is a schematic diagram showing the vehicle powertrain system of FIG. 1 configured to operate in another mode of operation.
Figure 5:
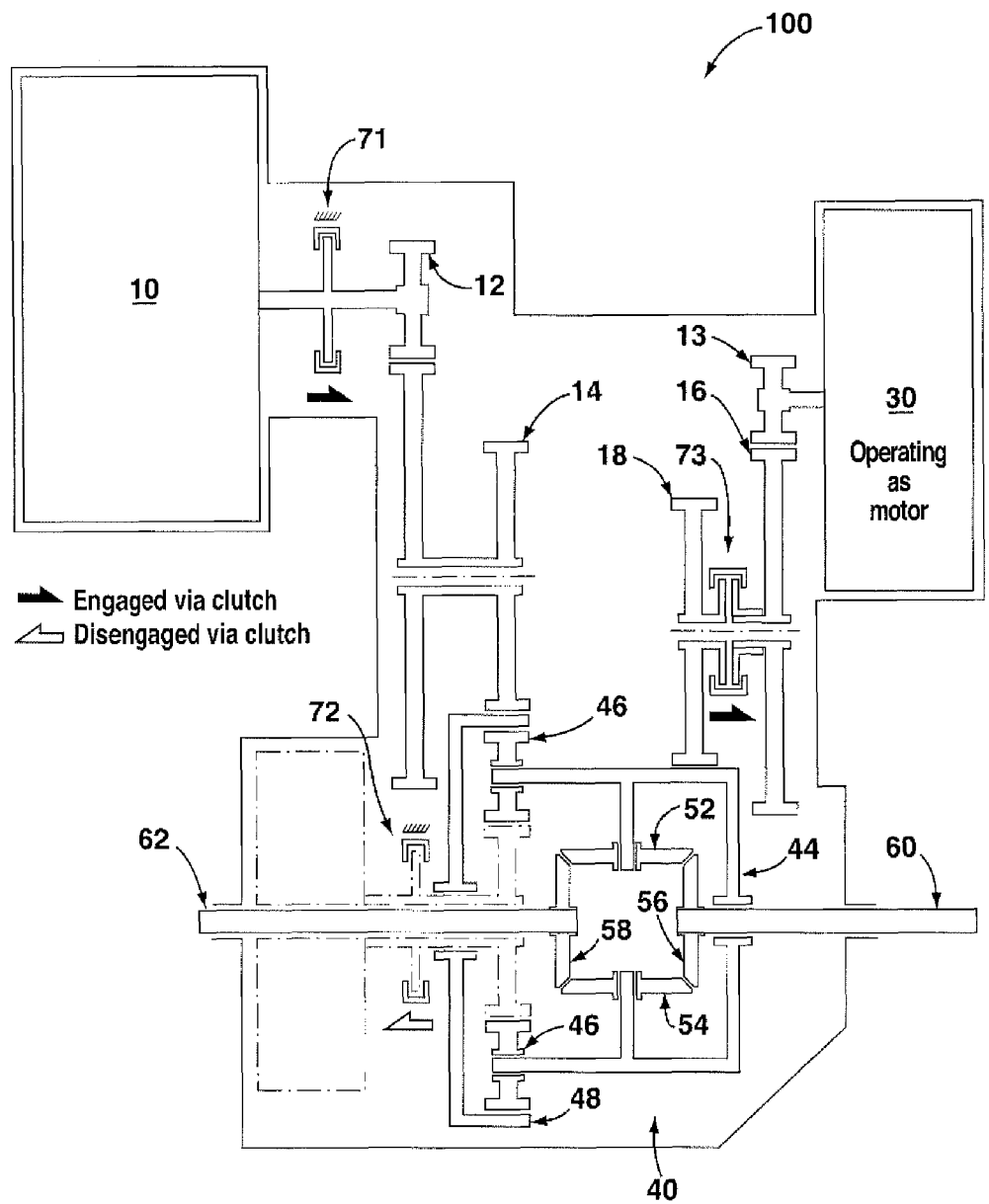
FIG. 5 is a schematic diagram showing the vehicle powertrain system of FIG. 1 configured to operate in another mode of operation.
Figure 6:
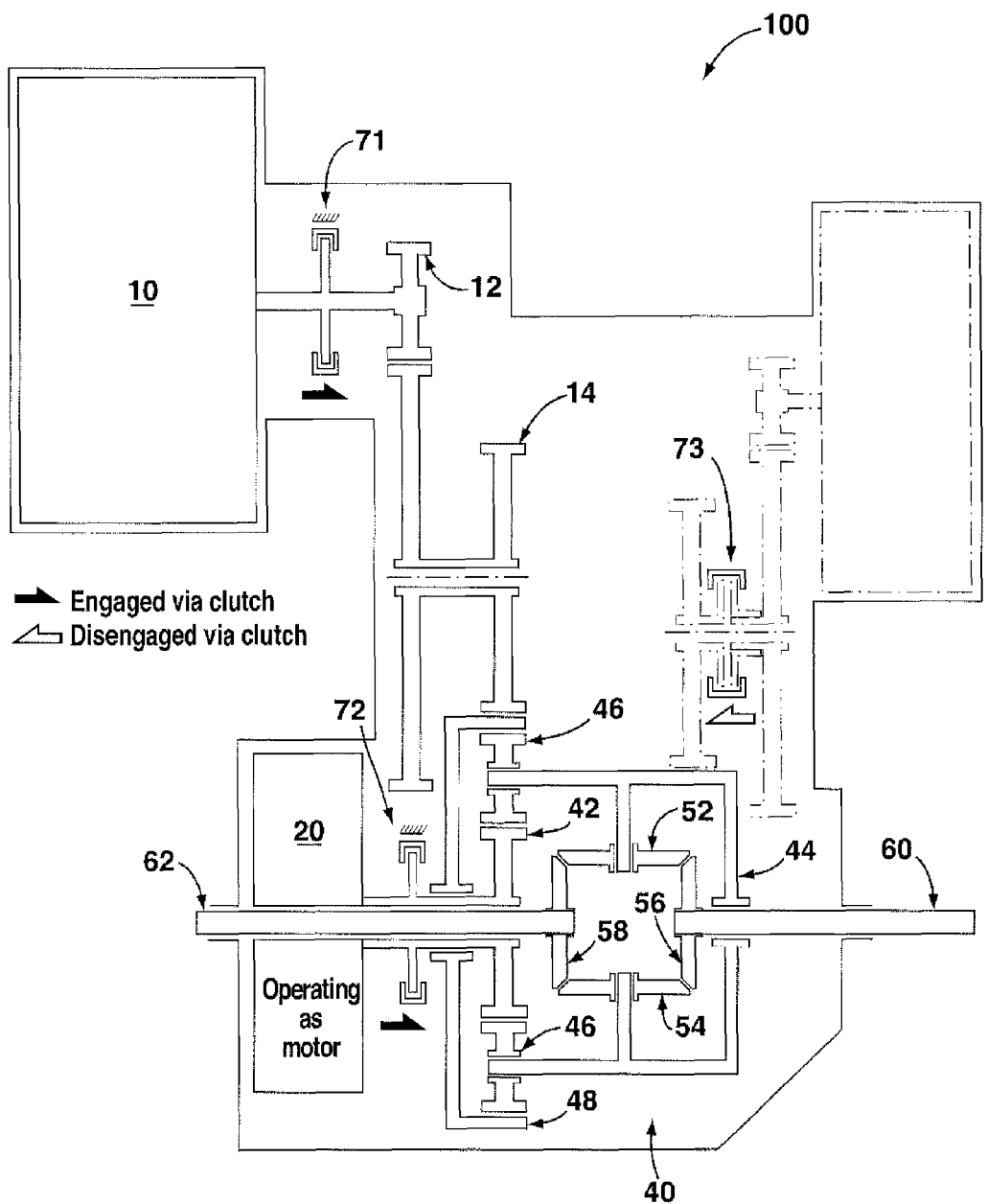
FIG. 6 is a schematic diagram showing the vehicle powertrain system of FIG. 1 configured to operate in another mode of operation.

In FIGS. 4-6, vehicle powertrain system 100 is shown as being configured in various parallel hybrid ("PH") modes of operation. In a first parallel hybrid ("PH1") mode of operation illustrated in FIG. 4, engine 10 and both electric machines 20, 30 supply tractive power and/or torque to the differential gear set. In this PH1 mode, engine clutch 71 is actuated to engage engine 10 and ring gear 48, first clutch 72 is actuated to engage electric machine 20 and sun gear 42, and second clutch 73 is actuated to engage electric machine 30 and planetary carrier 44. Electric machines 20 and 30 are each selected to operate as an electric motor. In this configuration, power and/or torque output by each of engine 10, electric machine 20, and electric machine 30 is transferred to planetary carrier 44, and the accumulated tractive power of the planetary gear set will be transferred to the drive wheels via the differential gear set. More specifically: i) power and/or torque will be transferred from engine 10 to planetary carrier 44 via engine output gear 12, reduction gear 14, ring gear 48, and one or more pinion gears 46; ii) power and/or torque will be transferred from electric machine 20 to planetary carrier 44 via sun gear 42 and one or more pinion gears 46; and iii) power and/or torque will be transferred from electric machine 30 to planetary carrier 44 via output gear 13, and reduction gears 16, 18.

In a second parallel hybrid ("PH2") mode of operation illustrated in FIG. 5, engine 10 and electric machine 30 supply tractive power and/or torque to the differential gear set. In this PH2 mode, engine clutch 71 is actuated to engage engine 10 and ring gear 48, first clutch 72 is actuated to disengage electric machine 20 from sun gear 42, and second clutch 73 is actuated to engage electric machine 30 and planetary carrier 44. Electric machine 30 is selected to operate as an electric motor. In this configuration, power and/or torque output by engine 10 and electric machine 30 is transferred to planetary carrier 44, and the accumulated tractive power of the planetary gear set will be transferred to the drive wheels via the differential gear set. More specifically: i) power and/or torque will be transferred from engine 10 to planetary carrier 44 via engine output gear 12, reduction gear 14, ring gear 48, and one or more pinion gears 46; and ii) power and/or torque will be transferred from electric machine 30 to planetary carrier 44 via output gear 13, and reduction gears 16, 18.

In a third parallel hybrid ("PH3") mode of operation illustrated in FIG. 6, engine 10 and electric machine 20 supply tractive power and/or torque to the differential gear set. In this PH3 mode, engine clutch 71 is actuated to engage engine 10 and ring gear 48, first clutch 72 is actuated to engage electric machine 20 and sun gear 42, and second clutch 73 is actuated to disengage electric machine 30 from planetary carrier 44. Electric machine 20 is selected to operate as an electric motor. In this configuration, power and/or torque output by engine 10 and electric machine 20 is transferred to planetary carrier 44, and the accumulated tractive power of the planetary gear set will be transferred to the drive wheels via the differential gear set. More specifically: i) power and/or torque will be transferred from engine 10 to planetary carrier 44 via engine output gear 12, reduction gear 14, ring gear 48, and one or more pinion gears 46; and ii) power and/or torque will be transferred from electric machine 20 to planetary carrier 44 via sun gear 42 and one or more pinion gears 46.

Figure 7:
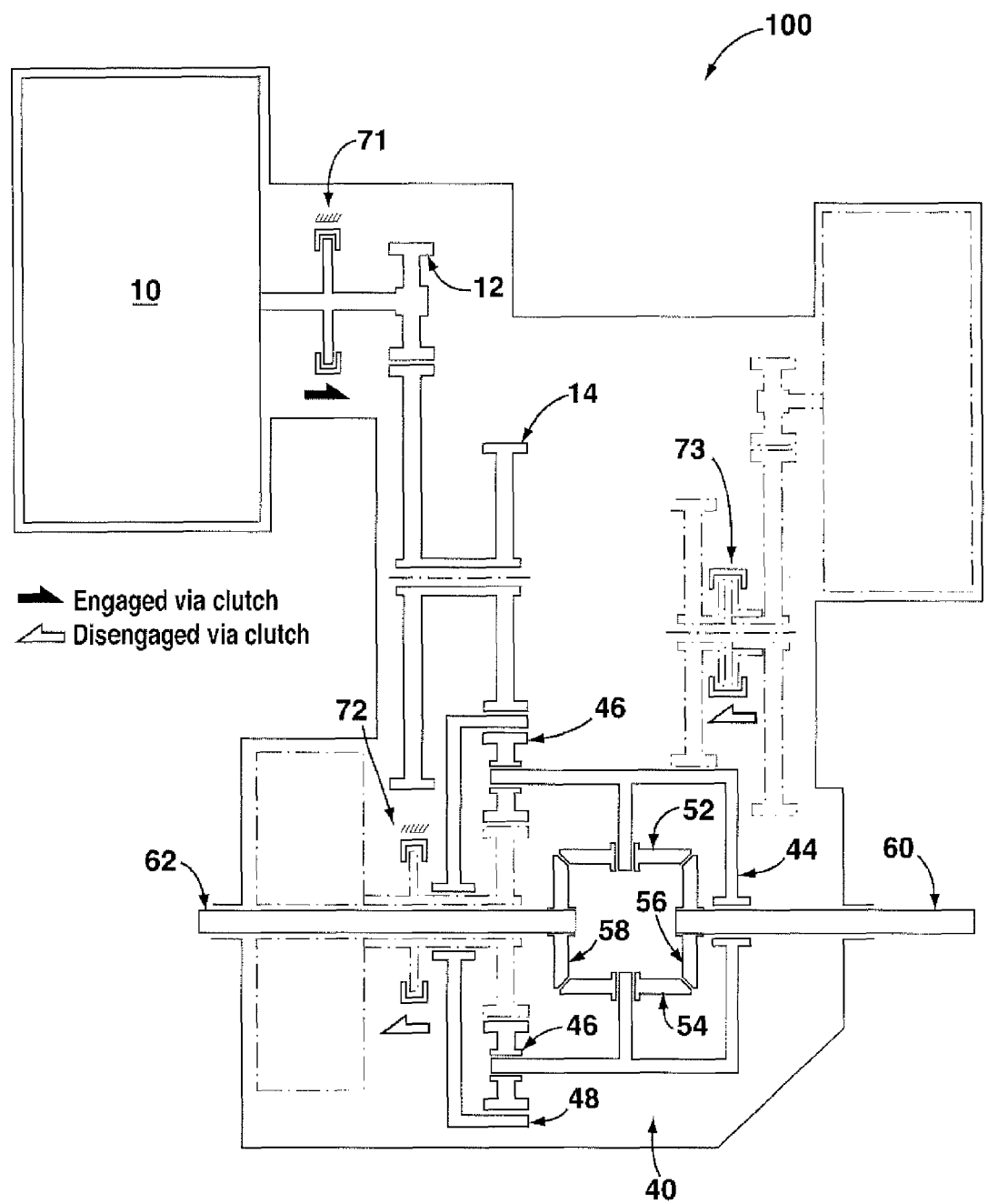
FIG. 7 is a schematic diagram showing the vehicle powertrain system of FIG. 1 configured to operate in another mode of operation.

In FIG. 7, vehicle powertrain system 100 is shown as being configured in what may be referred to as a conventional ("CON") mode of operation. In this CON mode, engine 10 supplies the tractive power, and first and second clutches 72, 73 are actuated to disengage electric machines 20 and 30 from the differential gear set. More specifically, power and/or torque will be transferred from engine 10 to planetary carrier 44 via engine output gear 12, reduction gear 14, ring gear 48, and one or more pinion gears 46.

Figure 8:
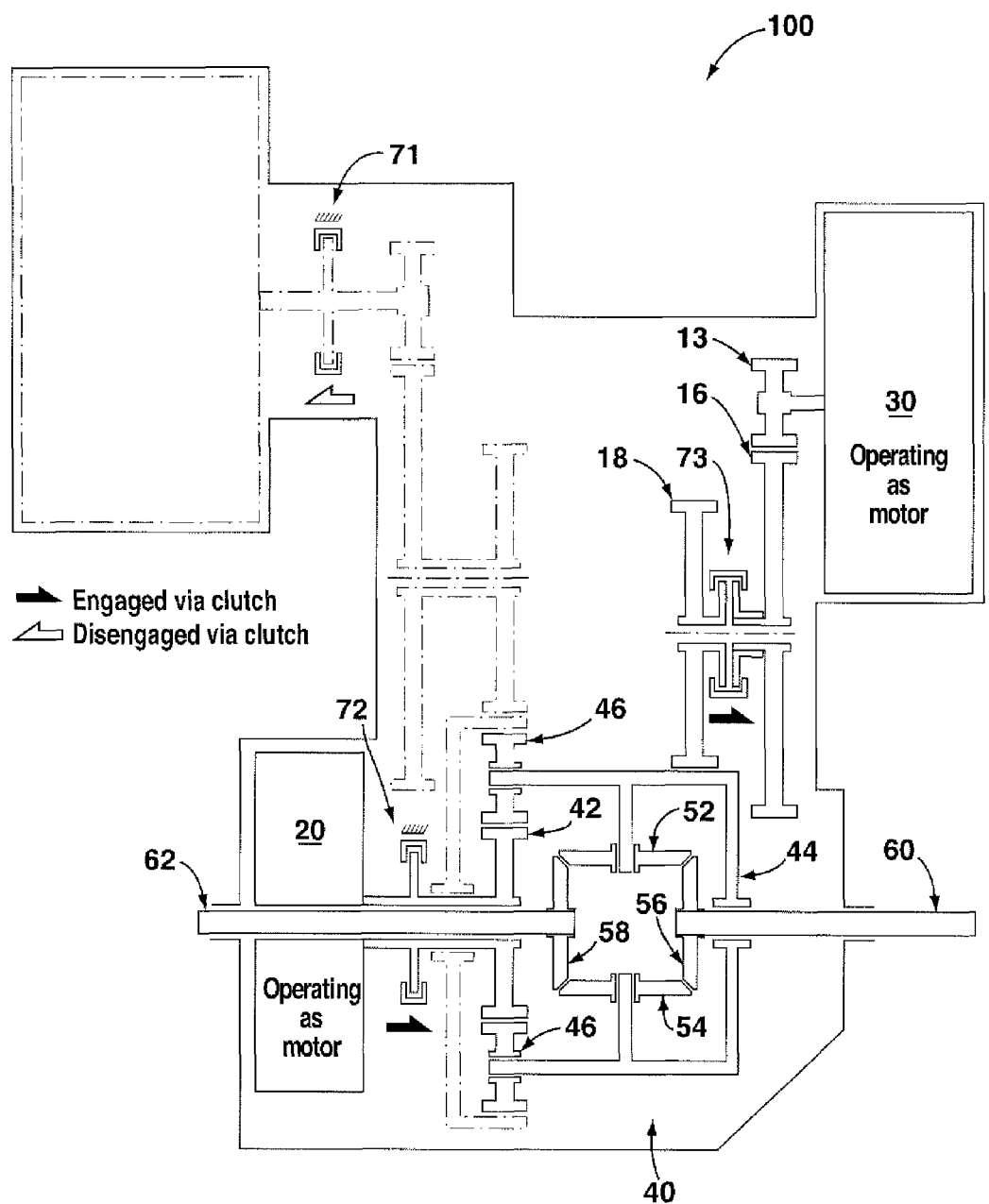
FIG. 8 is a schematic diagram showing the vehicle powertrain system of FIG. 1 configured to operate in another mode of operation.
Figure 9:
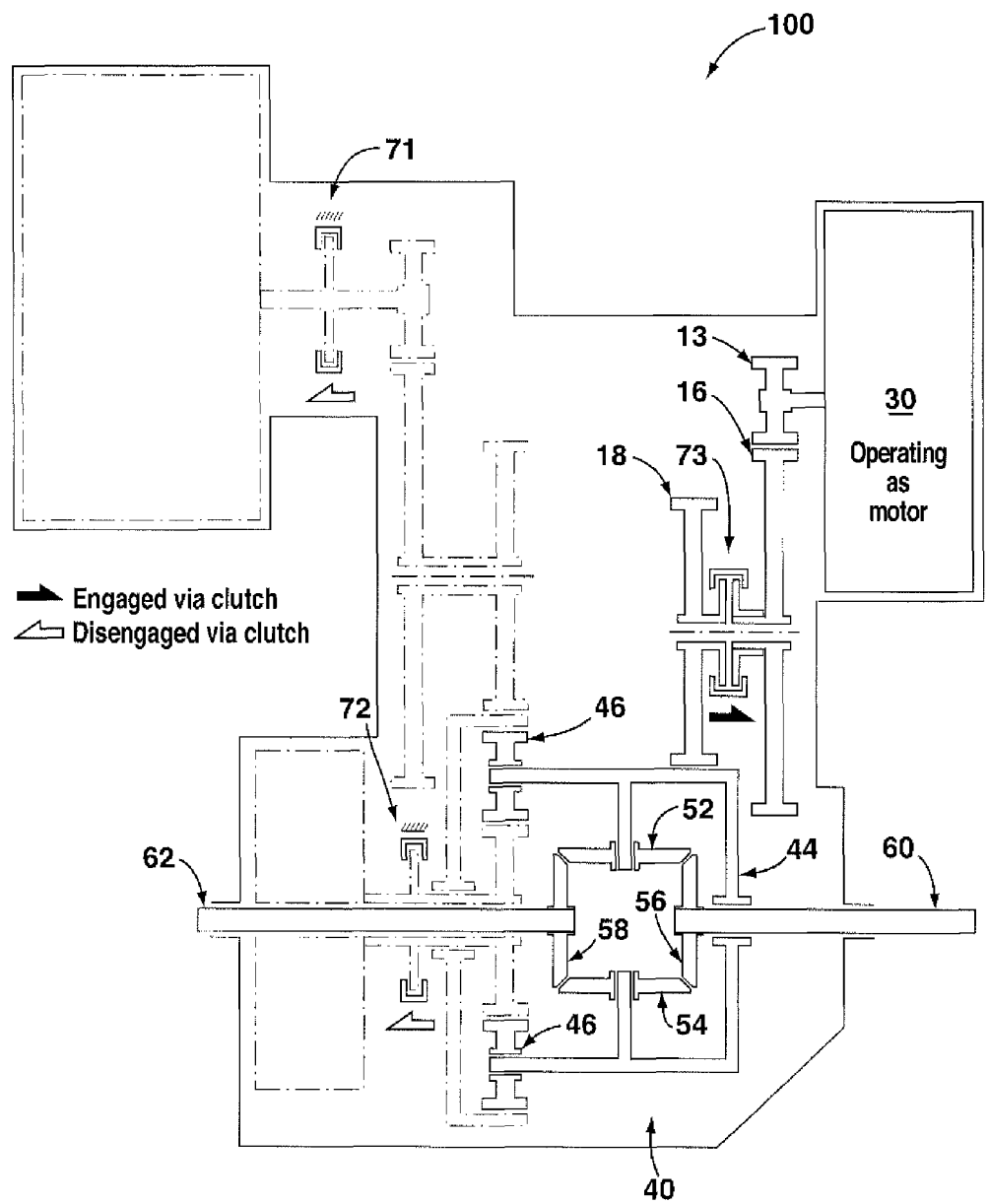
FIG. 9 is a schematic diagram showing the vehicle powertrain system of FIG. 1 configured to operate in another mode of operation.
Figure 10:
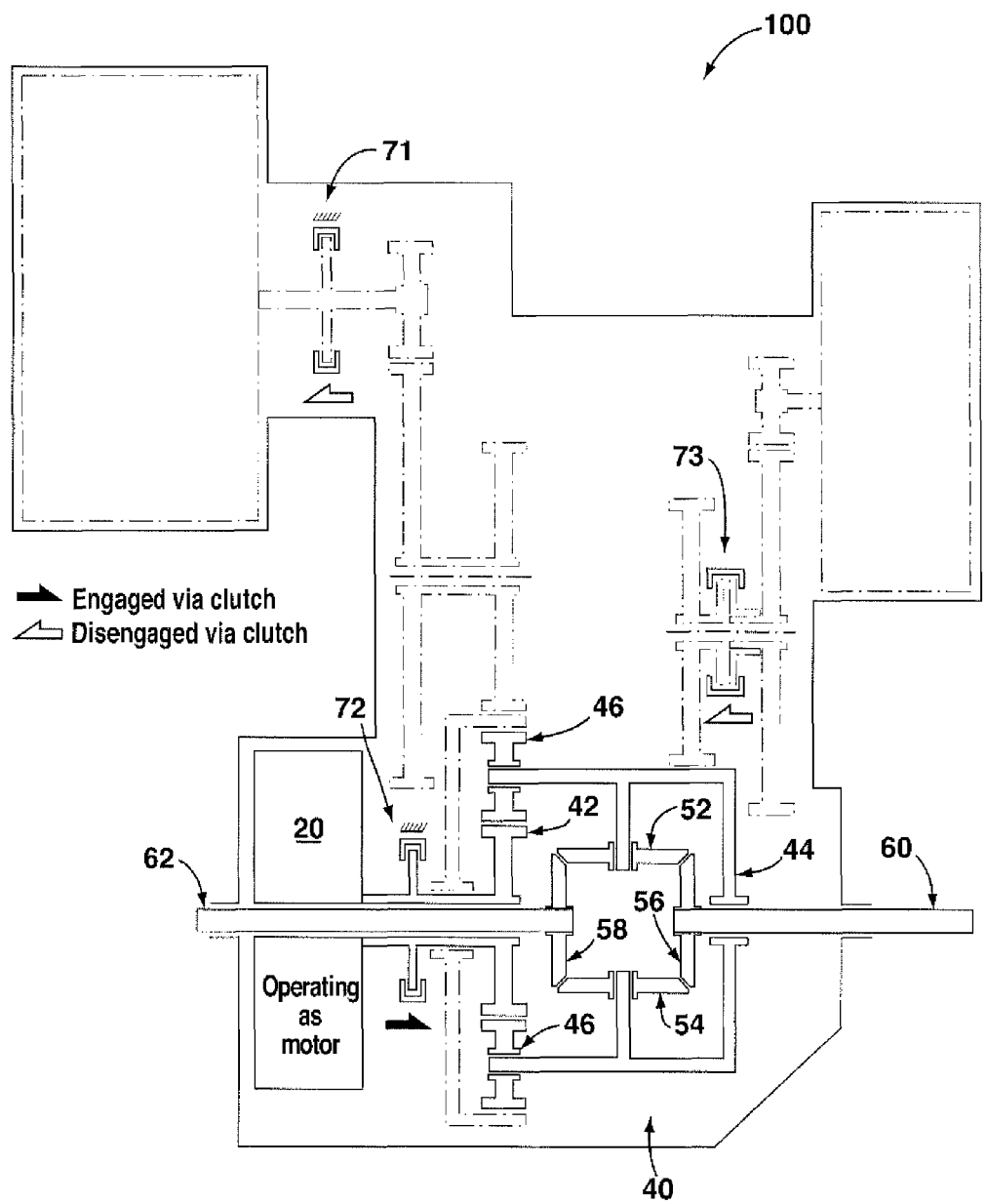
FIG. 10 is a schematic diagram showing the vehicle powertrain system of FIG. 1 configured to operate in another mode of operation.

In FIGS. 8-10, vehicle powertrain system 100 is shown as being configured in various pure electric ("PE") modes of operation. In a first pure electric ("PE1") mode of operation illustrated in FIG. 8, both electric machines 20, 30 supply tractive power and/or torque to the differential gear set. In this PE1 mode, engine clutch 71 is actuated to disengage engine 10 and ring gear 48, first clutch 72 is actuated to engage electric machine 20 and sun gear 42, and second clutch 73 is actuated to engage electric machine 30 and planetary carrier 44. Electric machines 20 and 30 are each selected to operate as an electric motor. In this configuration, power and/or torque output by electric machines 20, 30 is transferred to planetary carrier 44, and the accumulated tractive power of the planetary gear set will be transferred to the drive wheels via the differential gear set. More specifically: i) power and/or torque will be transferred from electric machine 20 to planetary carrier 44 via sun gear 42 and one or more pinion gears 46; and ii) power and/or torque will be transferred from electric machine 30 to planetary carrier 44 via output gear 13, and reduction gears 16, 18.

In a second pure electric ("PE2") mode of operation illustrated in FIG. 9, only electric machine 30 supplies tractive power and/or torque to the differential gear set. In this PE2 mode, engine clutch 71 is actuated to disengage engine 10 and ring gear 48, first clutch 72 is actuated to disengage electric machine 20 from sun gear 42, and second clutch 73 is actuated to engage electric machine 30 and planetary carrier 44. Electric machine 30 is selected to operate as an electric motor. In this configuration, power and/or torque output by electric machine 30 is transferred to planetary carrier 44 via output gear 13, and reduction gears 16, 18, and the accumulated tractive power of the planetary gear set will be transferred to the drive wheels via the differential gear set.

In a third pure electric ("PE3") mode of operation illustrated in FIG. 10, only electric machine 20 supplies tractive power and/or torque to the differential gear set. In this PE3 mode, engine clutch 71 is actuated to disengage engine 10 and ring gear 48, first clutch 72 is actuated to engage electric machine 20 and sun gear 42, and second clutch 73 is actuated to disengage electric machine 30 from planetary carrier 44. Electric machine 20 is selected to operate as an electric motor. In this configuration, power and/or torque output by electric machine 20 will be transferred from electric machine 20 to planetary carrier 44 via sun gear 42 and one or more pinion gears 46, and the accumulated tractive power of the planetary gear set will be transferred to the drive wheels via the differential gear set.

In the pure electric modes of operation PE1, PE2, and PE3 shown in FIGS. 8-10, respectively, electric machines 20, 30 are operating as electric motors. However, it will be appreciated that any one of these operating modes may be used to effect regenerative braking, wherein electric machines 20, 30 are operating as electric generators, and the power and/or torque flows are generally reversed. For example, with clutches 71, 72, and 73 actuated to effect the mechanical engagement and disengagement of PE3 mode, electric machine 20 may be selected to operate as an electric generator, and slow the vehicle by extracting power from the planetary gear set.

Accordingly, in some embodiments vehicle powertrain system 100 may be capable of operating in at least nine modes of operation. The modes of operation may be selected dynamically during operation of the vehicle, in response to the current operating condition of the vehicle. This operating flexibility may provide the powertrain system with added functional efficiency when compared to current technologies.

For example, in some embodiments vehicle powertrain system 100, or a controller connected thereto, may be configured to monitor at least one vehicle operating condition, including, but not limited to vehicle speed, engine speed, throttle input, brake input, etc. Based on the at least one monitored condition, the vehicle powertrain system or controller may determine a target power to be transferred between the wheels of the vehicle via the differential gear set. Based on this determined target power, the vehicle powertrain system or controller may selectively actuate at least one of clutches 71, 72, 73 and/or selectively operate electric machines 20, 30 as either electric motors or electric generators to effect one of the modes of operation discussed above, which may be the mode of operation determined to be most suitable and/or efficient based on the vehicle operating condition.

By providing at least three different modes of operation that can be used in regenerative braking, vehicle drivetrain system 100 may greatly enhance the kinetic energy recovery of the vehicle during braking by selecting a mode of operation that can most efficiently recover power based on the operating condition of the vehicle while braking is being applied.

As mentioned above, engine 10 and first and second electric machines 20, 30 can be operated independently, which may significantly enhance reliability of the powertrain system during failure of one or more of the power sources, as modes of operation may be selected based on the current ability of the power sources to supply power to the drivetrain. For example, in each of the CON, PE2, and PE3 modes of operation, only one power source is required to supply tractive power to drive the vehicle. Having each of the power sources operable independently may also minimize idling and extend operating life of components such as bearings.

Figure 11:
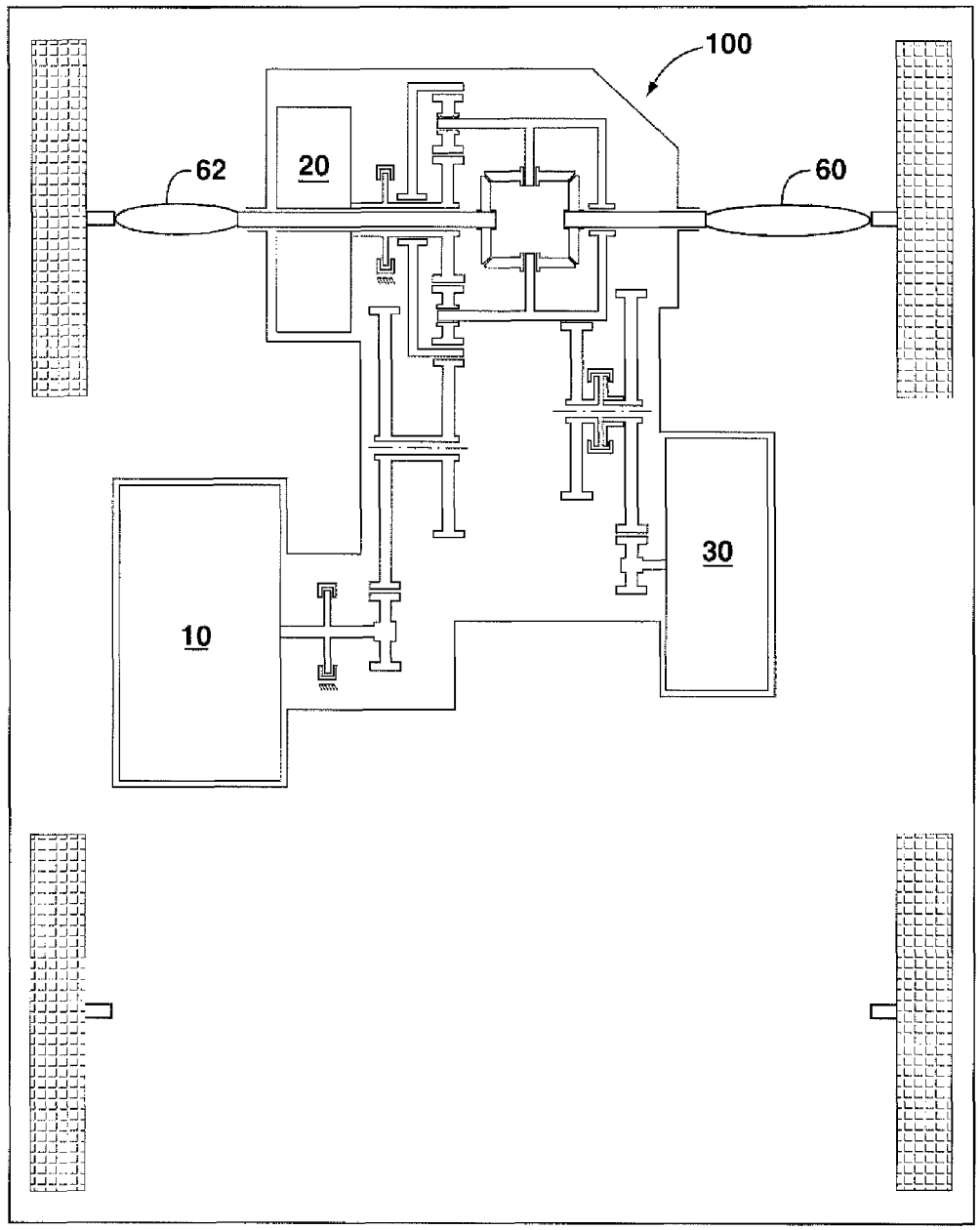
FIG. 11 is a schematic diagram of a vehicle in which the front wheels are driven by the vehicle powertrain system of FIG. 1.
Figure 12:
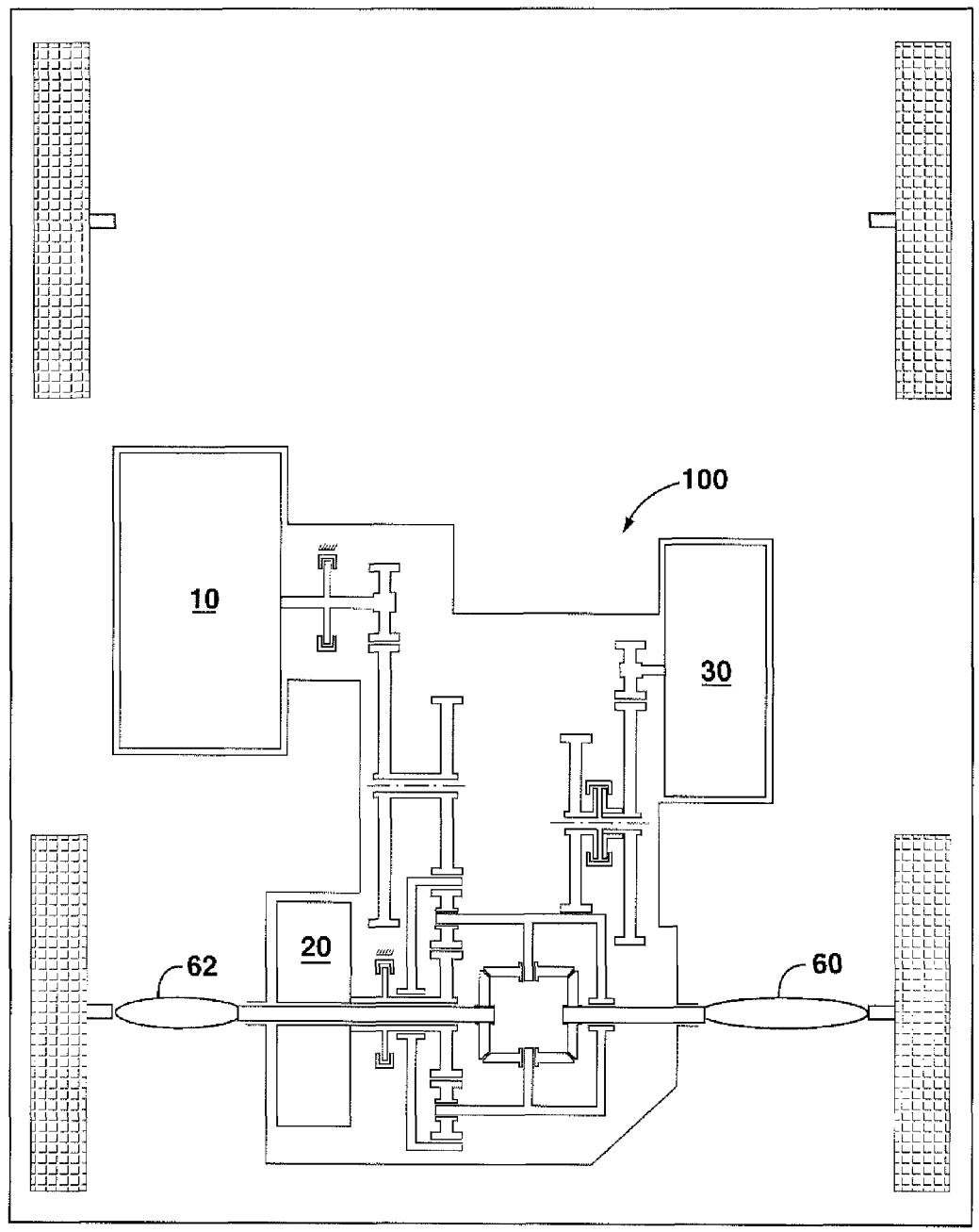
FIG. 12 is a schematic diagram of a vehicle in which the rear wheels are driven by the vehicle powertrain system of FIG. 1.

It will be appreciated that vehicle powertrain system 100 may be used to drive the front wheels of a vehicle, as shown in FIG. 11, or to drive the rear wheels of a vehicle, as shown in FIG. 12, where vehicle powertrain system 100 is located towards the rear of the vehicle.

Figure 13:
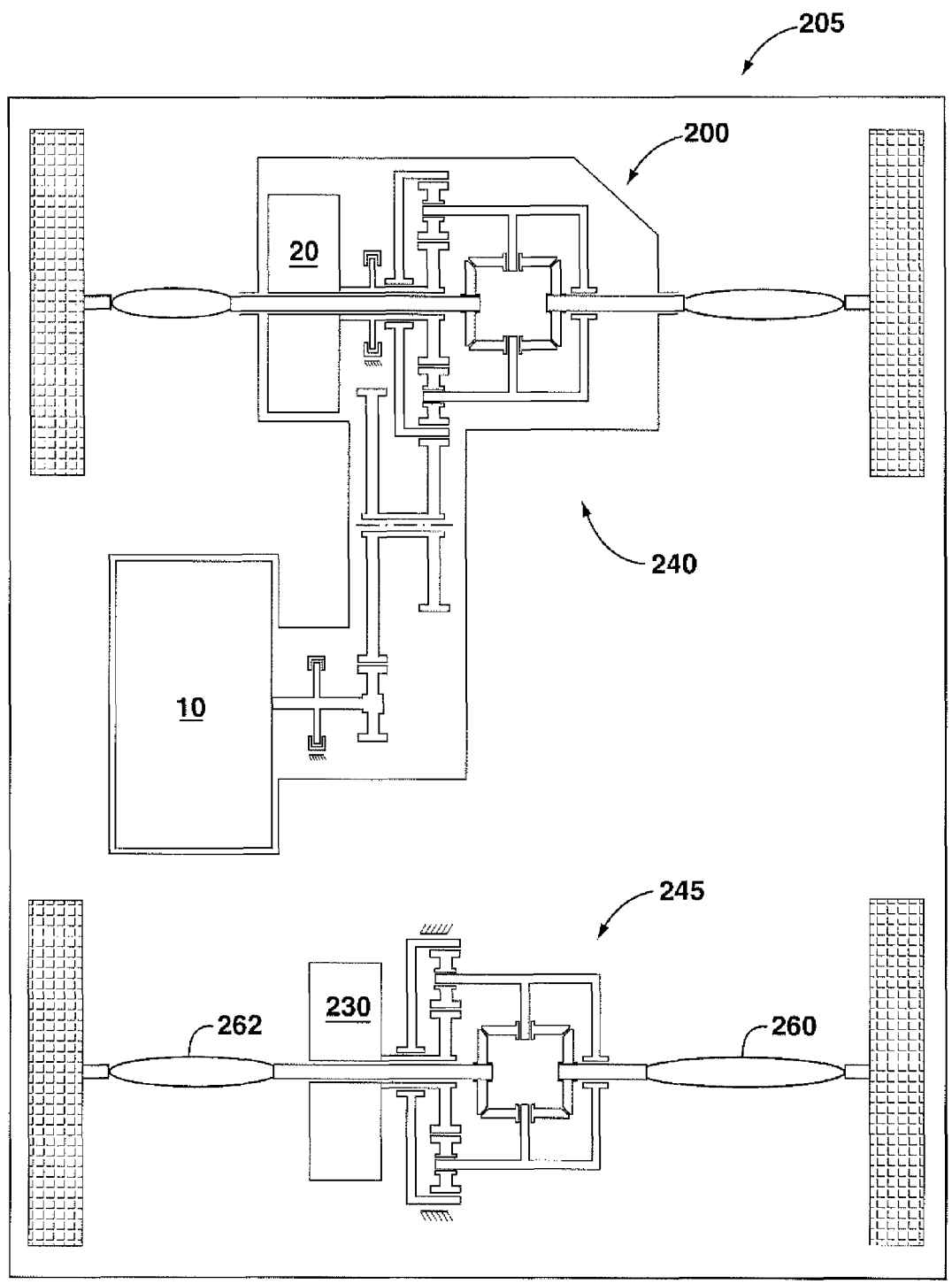
FIG. 13 is a schematic diagram of a vehicle in which the front wheels are driven by at least one other embodiment of a vehicle powertrain system, and the rear wheels are driven by an electric machine.
Figure 14:
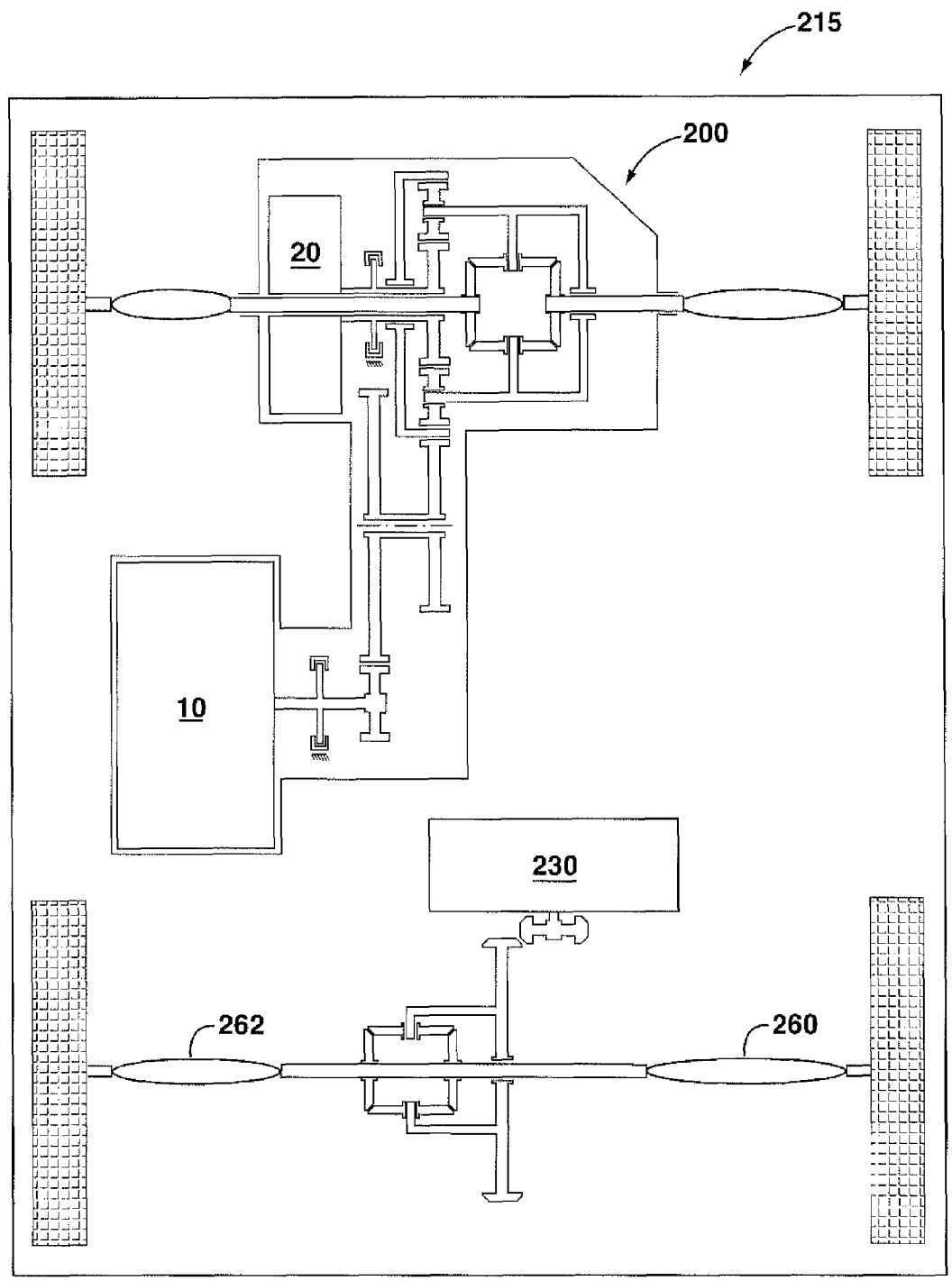
FIG. 14 is a schematic diagram of another vehicle in which the front wheels are driven by at least one other embodiment of a vehicle powertrain system, and the rear wheels are driven by an electric machine.

In some embodiments, the vehicle powertrain system may be modified for use with four wheel (or all-wheel) drive systems by coupling an electric machine to a rear axle of a vehicle as shown in FIGS. 13 and 14.

In FIG. 13 an example embodiment of a vehicle powertrain system 200, is configured to transfer power and/or torque between differential gear set 240 in order to drive the front wheels of a vehicle 205. Powertrain system 200 includes an internal combustion engine 10 and a first electric machine 20, each independently coupled to a planetary gear set 240. Other than the omission of second electric machine 30 and associated components, powertrain system 200 is generally similar to powertrain system 100 depicted in FIG. 1, and the description of elements will not be repeated. Vehicle 210 also includes an electric machine 230 coupled to rear drive axels 260, 262 via a differential gear set 245, for transferring power and/or torque between the differential gear set 245 and the rear wheels of vehicle 210.

Similar to vehicle powertrain system 100, engine 10 and first electric machine 20 may be operated independently, which may significantly enhance reliability of powertrain system 200 during failure of either of the power sources. Having each of the power sources operable independently may also minimize idling and extend operating life of components such as bearings.

The example embodiment shown in FIG. 14 is similar to the embodiment shown in FIG. 13, but with a different coupling arrangement for transferring power and/or torque between electric machine 230 and the rear wheels of a vehicle 215.

It will be appreciated that vehicle powertrain system 200 may be selectively configured to operate in a number of different modes of operation by selectively actuating one or more clutches 71, 72, and by selectively operating electric machine 20 as an electric motor or an electric generator, in a manner generally similar vehicle powertrain system 100. For example, vehicle powertrain system 200 may be selectively operated in modes of operation similar to the ICES, PH3, CON, and PE3 modes of operation. It will also be appreciated that vehicle powertrain system 200 may be used to effect regenerative braking, as discussed above.

Figure 15:
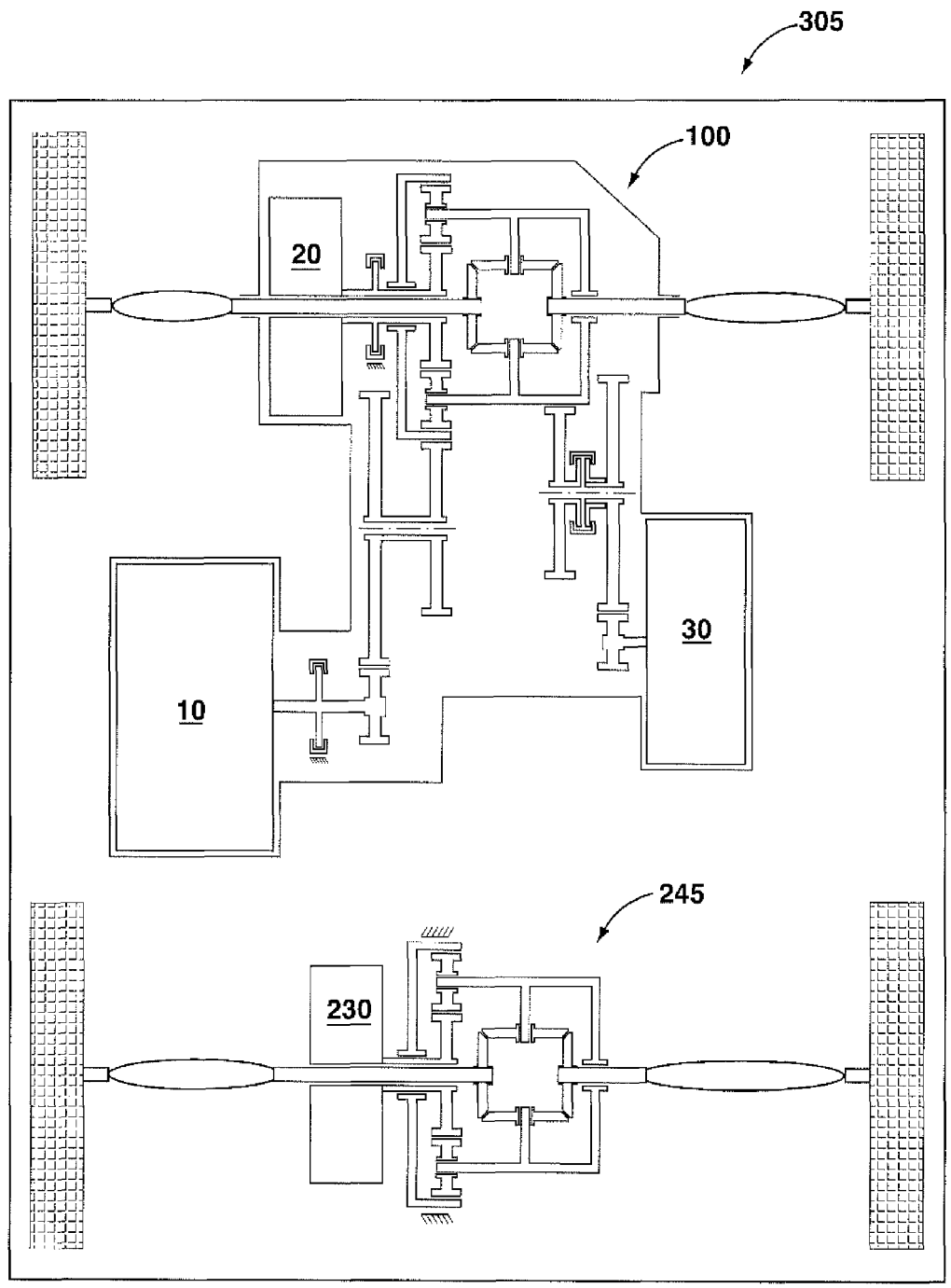
FIGS. 15 and 16 are further schematic diagrams similar to FIG. 14, but with an additional electric machine used to drive the rear wheels.
Figure 16:
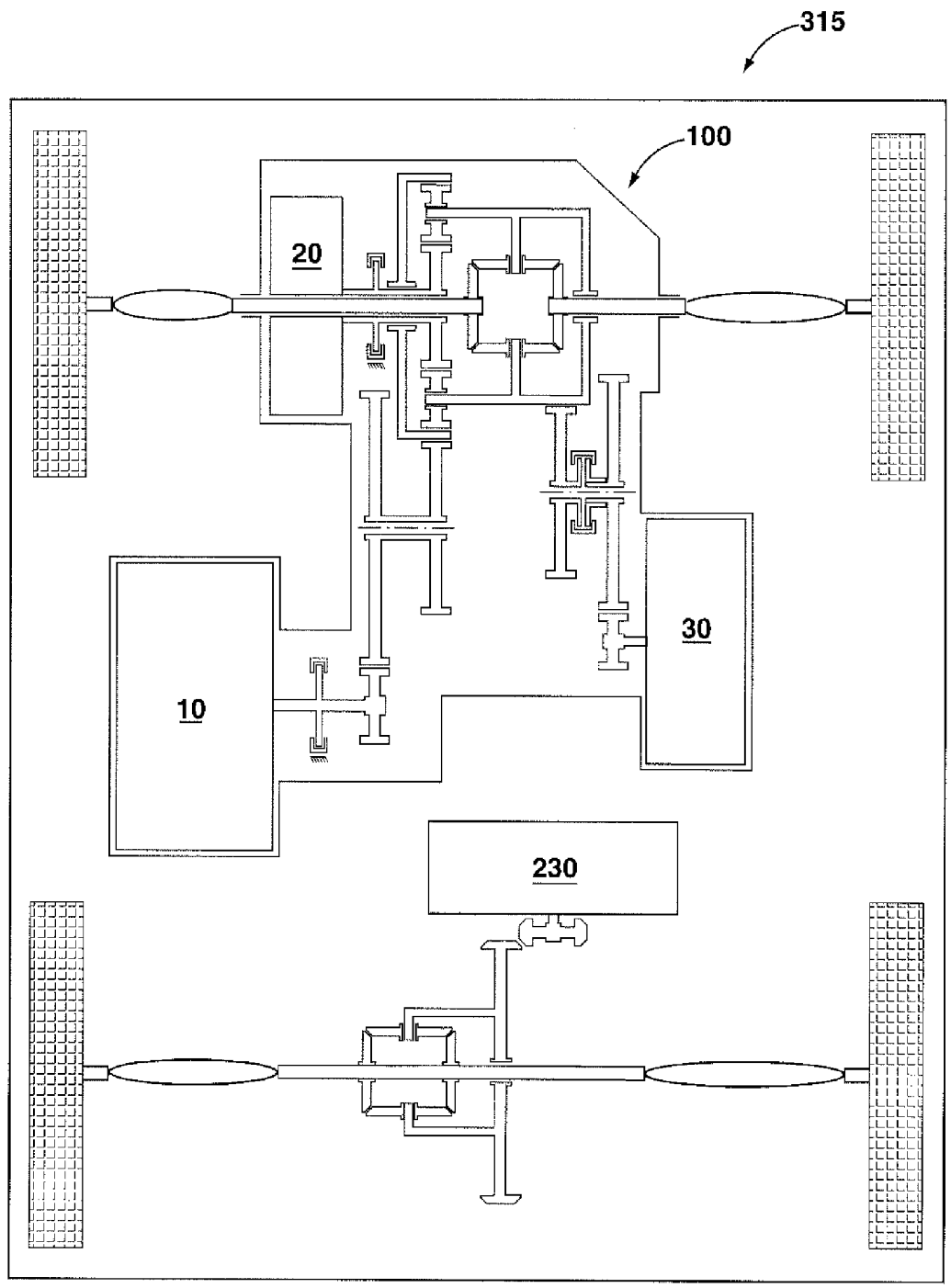

FIGS. 15 and 16 illustrate example embodiments of vehicles 305 and 315, respectively, in which a powertrain generally similar to vehicle powertrain 100 is used to drive the front wheels, and an additional electric machine 330 is used to drive the rear wheels.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that variations are possible in variant implementations and embodiments.

The invention claimed is:

1. A vehicle powertrain system comprising:
a differential gear set;
a single planetary gear set coupled to the differential gear set;
an engine coupled to the planetary gear set to transfer power between the engine and the planetary gear set;
a first electric machine coupled to the planetary gear set via a first clutch and selectively engagable, via actuation of the first clutch, to transfer power between the first electric machine and the planetary gear set; and
a second electric machine coupled to the planetary gear set via a second clutch and selectively engagable, via actuation of the second clutch, to transfer power between the second electric machine and the planetary gear set.

2. The vehicle powertrain system of claim 1, wherein the engine comprises an internal combustion engine.

3. The vehicle powertrain system of claim 1, wherein the planetary gear set comprises a sun gear, a ring gear, at least one pinion gear, and a planetary carrier.

4. The vehicle powertrain system of claim 3, wherein the first electric machine is coupled to the sun gear of the planetary gear set via the first clutch.

5. The vehicle powertrain system of claim 3, further comprising an electric machine reduction gear set, and wherein the second electric machine is coupled to the planetary carrier via the electric machine reduction gear set.

6. The vehicle powertrain system of claim 5, wherein the electric machine reduction gear set comprises first and second electric machine reduction gears, and wherein the second clutch is located between the first and second electric machine reduction gears.

7. The vehicle powertrain system of claim 1, wherein the differential gear set comprises at least one differential pinion gear and at least one differential output gear.

8. The vehicle powertrain system of claim 1, wherein at least one of the first clutch and the second clutch comprises an electro mechanically actuated clutch.

9. The vehicle powertrain system of claim 1, further comprising an engine reduction gear set, and wherein the engine is coupled to the planetary gear set via the engine reduction gear set.

10. The vehicle powertrain system of claim 1, wherein the first electric machine and the second electric machine are each selectively operable as either an electric motor or as an electric generator, and wherein:
  in a first mode of operation,
    the first clutch is actuated to engage the first electric machine and the planetary gear set, and
    the first electric machine is selected to operate as an electric motor,
    whereby power may be transferred
      from the first electric machine to the engine via the differential gear set;
  in a second mode of operation,
    the first clutch is actuated to engage the first electric machine and the planetary gear set,
    the first electric machine is selected to operate as an electric generator,
    the second clutch is actuated to engage the second electric machine and the planetary gear set, and
    the second electric machine is selected to operate as an electric motor,
    whereby power may be transferred
      from the engine to the differential gear set,
      from the second electric machine to the differential gear set, and
      to the first electric machine from the differential gear set;
  in a third mode of operation,
    the first clutch is actuated to engage the first electric machine and the planetary gear set,
    the first electric machine is selected to operate as an electric motor,
    the second clutch is actuated to engage the second electric machine and the planetary gear set, and
    the second electric machine is selected to operate as an electric motor,
    whereby power may be transferred
      from the engine to the differential gear set,
      from the second electric machine to the differential gear set, and
      from the first electric machine to the differential gear set;
  in a fourth mode of operation,
    the first clutch is actuated to disengage the first electric machine and the planetary gear set,
    the second clutch is actuated to engage the second electric machine and the planetary gear set, and
    the second electric machine is selected to operate as an electric motor,
    whereby power may be transferred
      from the engine to the differential gear set, and
      from the second electric machine to the differential gear set;
  in a fifth mode of operation,
    the first clutch is actuated to engage the first electric machine and the planetary gear set,
    the first electric machine is selected to operate as an electric motor, and
    the second clutch is actuated to disengage the second electric machine and the planetary gear set,
    whereby power may be transferred
      from the engine to the differential gear set,
      from the first electric machine to the differential gear set; and
  in a sixth mode of operation,
    the first clutch is actuated to disengage the first electric machine and the planetary gear set,
    the second clutch is actuated to disengage the second electric machine and the planetary gear set,
    whereby power may be transferred
      from the engine to the differential gear set.

11. The vehicle powertrain system of claim 1, wherein the engine is coupled to the planetary gear set via an engine clutch, and wherein the engine is selectably engagable, via actuation of the engine clutch, to transfer power between the engine and the planetary gear set.

12. The vehicle powertrain system of claim 11, further comprising an engine reduction gear set, and wherein the engine is coupled to the planetary gear set via the engine reduction gear set.

13. The vehicle powertrain system of claim 12, wherein the engine reduction gear set is located between the engine clutch and the planetary gear set.

14. The vehicle powertrain system of claim 11, wherein at least one of the engine clutch, the first clutch, and the second clutch comprises an electro mechanically actuated clutch.

15. The vehicle powertrain system of claim 11, wherein the first electric machine and the second electric machine are each selectively operable as either an electric motor or as an electric generator, and wherein:
  in a first mode of operation,
    the engine clutch is actuated to engage the engine and the planetary gear set;
    the first clutch is actuated to engage the first electric machine and the planetary gear set, and
    the first electric machine is selected to operate as an electric motor,
    whereby power may be transferred
      from the first electric machine to the engine via the differential gear set;
  in a second mode of operation,
    the engine clutch is actuated to engage the engine and the planetary gear set;
    the first clutch is actuated to engage the first electric machine and the planetary gear set,
    the first electric machine is selected to operate as an electric generator,
    the second clutch is actuated to engage the second electric machine and the planetary gear set, and
    the second electric machine is selected to operate as an electric motor,
    whereby power may be transferred
      from the engine to the differential gear set,
      from the second electric machine to the differential gear set, and
      to the first electric machine from the differential gear set;
  in a third mode of operation,
    the engine clutch is actuated to engage the engine and the planetary gear set;
    the first clutch is actuated to engage the first electric machine and the planetary gear set,
    the first electric machine is selected to operate as an electric motor, the second clutch is actuated to engage the second electric machine and the planetary gear set, and
    the second electric machine is selected to operate as an electric motor,
    whereby power may be transferred
      from the engine to the differential gear set,
      from the second electric machine to the differential gear set, and
      from the first electric machine to the differential gear set;
  in a fourth mode of operation, the engine clutch is actuated to engage the engine and the planetary gear set;
the first clutch is actuated to disengage the first electric machine and the planetary gear set,
the second clutch is actuated to engage the second electric machine and the planetary gear set, and
the second electric machine is selected to operate as an electric motor,
whereby power may be transferred
from the engine to the differential gear set, and
from the second electric machine to the differential gear set;
in a fifth mode of operation,
the engine clutch is actuated to engage the engine and the planetary gear set;
the first clutch is actuated to engage the first electric machine and the planetary gear set,
the first electric machine is selected to operate as an electric motor, and
the second clutch is actuated to disengage the second electric machine and the planetary gear set,
whereby power may be transferred
from the engine to the differential gear set,
from the first electric machine to the differential gear set;
in a sixth mode of operation,
the engine clutch is actuated to engage the engine and the planetary gear set;
the first clutch is actuated to disengage the first electric machine and the planetary gear set,
the second clutch is actuated to disengage the second electric machine and the planetary gear set,
whereby power may be transferred
from the engine to the differential gear set;
in a seventh mode of operation,
the engine clutch is actuated to disengage the engine and the planetary gear set;
the first clutch is actuated to engage the first electric machine and the planetary gear set,
the first electric machine is selected to operate as an electric motor, the second clutch is actuated to engage the second electric machine and the planetary gear set, and
the second electric machine is selected to operate as an electric motor,
whereby power may be transferred
from the first electric machine to the differential gear set, and
from the second electric machine to the differential gear set;
in an eighth mode of operation,
the engine clutch is actuated to disengage the engine and the planetary gear set;
the first clutch is actuated to disengage the first electric machine and the planetary gear set,
the second clutch is actuated to engage the second electric machine and the planetary gear set, and
the second electric machine is selected to operate as an electric motor,
whereby power may be transferred
from the second electric machine to the differential gear set;
in a ninth mode of operation,
the engine clutch is actuated to disengage the engine and the planetary gear set;
the first clutch is actuated to engage the first electric machine and the planetary gear set,
the first electric machine is selected to operate as an electric motor, and
the second clutch is actuated to disengage the second electric machine and the planetary gear set,
whereby power may be transferred
from the first electric machine to the differential gear set.

16. A vehicle powertrain system comprising:
a planetary gear set comprising:
a sun gear,
a ring gear, and
a planetary carrier;
a differential gear set coupled to the planetary gear set,
the differential gear set comprising at least one differential pinion gear, a first differential output gear connected to a first drive axel, and a second differential output gear connected to a second drive axel;
an engine coupled to the ring gear to transfer power between the engine and the ring gear; and
a first electric machine coupled to the sun gear via a first clutch and selectively engagable, via actuation of the first clutch, to transfer power between the first electric machine and the sun gear.

17. The vehicle powertrain system of claim 16, wherein the first clutch comprises an electro mechanically actuated clutch.

18. The vehicle powertrain system of claim 16, further comprising an engine reduction gear set, and wherein the engine is coupled to the ring gear via the engine reduction gear set.

19. The vehicle powertrain system of claim 18, wherein the engine reduction gear set is located between the engine and the ring gear.

20. The vehicle powertrain system of claim 16, wherein the first electric machine is selectively operable as either an electric motor or as an electric generator, and wherein:
in a first mode of operation,
the first clutch is actuated to engage the first electric machine and the sun gear, and
the first electric machine is selected to operate as an electric motor,
whereby power may be transferred
from the first electric machine to the engine via the differential gear set;
in a second mode of operation,
the first clutch is actuated to engage the first electric machine and the sun gear, and
the first electric machine is selected to operate as an electric motor,
whereby power may be transferred
from the engine to the differential gear set, and
from the first electric machine to the differential gear set; and
in a third mode of operation,
the first clutch is actuated to disengage the first electric machine and the sun gear,
whereby power may be transferred
from the engine to the differential gear set.

21. The vehicle powertrain system of claim 16, wherein the engine is coupled to the ring gear via an engine clutch, and wherein the engine is selectably engagable, via actuation of the engine clutch, to transfer power between the engine and the ring gear.

22. The vehicle powertrain system of claim 21, wherein at least one of the first clutch and the engine clutch comprises an electro mechanically actuated clutch.

23. The vehicle powertrain system of claim 21, wherein the first electric machine is selectively operable as either an electric motor or as an electric generator, and wherein:
in a first mode of operation,
the engine clutch is actuated to engage the engine and the ring gear;
the first clutch is actuated to engage the first electric machine and the sun gear, and
the first electric machine is selected to operate as an electric motor,
whereby power may be transferred
from the first electric machine to the engine via the differential gear set;
in a second mode of operation,
the engine clutch is actuated to engage the engine and the ring gear;
the first clutch is actuated to engage the first electric machine and the sun gear, and
the first electric machine is selected to operate as an electric motor,
whereby power may be transferred
from the engine to the differential gear set,
from the first electric machine to the differential gear set;
in a third mode of operation,
the engine clutch is actuated to engage the engine and the ring gear; and
the first clutch is actuated to disengage the first electric machine and the sun gear,
whereby power may be transferred
from the engine to the differential gear set; and
in a fourth mode of operation,
the engine clutch is actuated to disengage the engine and the ring gear;
the first clutch is actuated to engage the first electric machine and the sun gear, and
the first electric machine is selected to operate as an electric motor,
whereby power may be transferred
from the first electric machine to the differential gear set.

24. A vehicle powertrain system comprising:
a differential gear set;
a planetary gear set coupled to the differential gear set;
an engine coupled to the planetary gear set to transfer power between the engine and the planetary gear set;
a first electric machine coupled to the planetary gear set via a first clutch and selectively engagable, via actuation of the first clutch, to transfer power between the first electric machine and the planetary gear set; and
a second electric machine coupled to the planetary gear set via a second clutch and selectively engagable, via actuation of the second clutch, to transfer power between the second electric machine and the planetary gear set;
wherein the first electric machine and the second electric machine are each selectively operable as either an electric motor or as an electric generator, and wherein:
in a first mode of operation,
the first clutch is actuated to engage the first electric machine and the planetary gear set, and
the first electric machine is selected to operate as an electric motor,
whereby power may be transferred
from the first electric machine to the engine via the differential gear set;
in a second mode of operation,
the first clutch is actuated to engage the first electric machine and the planetary gear set,
the first electric machine is selected to operate as an electric generator,
the second clutch is actuated to engage the second electric machine and the planetary gear set, and
the second electric machine is selected to operate as an electric motor,
whereby power may be transferred
from the engine to the differential gear set,
from the second electric machine to the differential gear set, and
to the first electric machine from the differential gear set;
in a third mode of operation,
the first clutch is actuated to engage the first electric machine and the planetary gear set,
the first electric machine is selected to operate as an electric motor,
the second clutch is actuated to engage the second electric machine and the planetary gear set, and
the second electric machine is selected to operate as an electric motor,
whereby power may be transferred
from the engine to the differential gear set,
from the second electric machine to the differential gear set, and
from the first electric machine to the differential gear set;
in a fourth mode of operation,
the first clutch is actuated to disengage the first electric machine and the planetary gear set,
the second clutch is actuated to engage the second electric machine and the planetary gear set, and
the second electric machine is selected to operate as an electric motor,
whereby power may be transferred
from the engine to the differential gear set, and
from the second electric machine to the differential gear set;
in a fifth mode of operation,
the first clutch is actuated to engage the first electric machine and the planetary gear set,
the first electric machine is selected to operate as an electric motor, and
the second clutch is actuated to disengage the second electric machine and the planetary gear set,
whereby power may be transferred
from the engine to the differential gear set,
from the first electric machine to the differential gear set; and
in a sixth mode of operation,
the first clutch is actuated to disengage the first electric machine and the planetary gear set,
the second clutch is actuated to disengage the second electric machine and the planetary gear set,
whereby power may be transferred
from the engine to the differential gear set.

25. A vehicle powertrain system comprising:
a differential gear set;
a planetary gear set coupled to the differential gear set;
an engine coupled to the planetary gear set to transfer power between the engine and the planetary gear set;
a first electric machine coupled to the planetary gear set via a first clutch and selectively engagable, via actuation of the first clutch, to transfer power between the first electric machine and the planetary gear set; and a second electric machine coupled to the planetary gear set via a second clutch and selectively engagable, via actuation of the second clutch, to transfer power between the second electric machine and the planetary gear set;

wherein the engine is coupled to the planetary gear set via an engine clutch, and wherein the engine is selectably engagable, via actuation of the engine clutch, to transfer power between the engine and the planetary gear set;

wherein the first electric machine and the second electric machine are each selectively operable as either an electric motor or as an electric generator, and wherein:

in a first mode of operation,
the engine clutch is actuated to engage the engine and the planetary gear set;
the first clutch is actuated to engage the first electric machine and the planetary gear set, and
the first electric machine is selected to operate as an electric motor,
whereby power may be transferred
from the first electric machine to the engine via the differential gear set;

in a second mode of operation,
the engine clutch is actuated to engage the engine and the planetary gear set;
the first clutch is actuated to engage the first electric machine and the planetary gear set,
the first electric machine is selected to operate as an electric generator,
the second clutch is actuated to engage the second electric machine and the planetary gear set, and
the second electric machine is selected to operate as an electric motor,
whereby power may be transferred
from the engine to the differential gear set,
from the second electric machine to the differential gear set, and
to the first electric machine from the differential gear set;

in a third mode of operation,
the engine clutch is actuated to engage the engine and the planetary gear set;
the first clutch is actuated to engage the first electric machine and the planetary gear set,
the first electric machine is selected to operate as an electric motor,
the second clutch is actuated to engage the second electric machine and the planetary gear set, and
the second electric machine is selected to operate as an electric motor,
whereby power may be transferred
from the engine to the differential gear set,
from the second electric machine to the differential gear set, and
from the first electric machine to the differential gear set;

in a fourth mode of operation,
the engine clutch is actuated to engage the engine and the planetary gear set;
the first clutch is actuated to disengage the first electric machine and the planetary gear set,
the second clutch is actuated to engage the second electric machine and the planetary gear set, and
the second electric machine is selected to operate as an electric motor,
whereby power may be transferred
from the engine to the differential gear set, and
from the second electric machine to the differential gear set;

in a fifth mode of operation,
the engine clutch is actuated to engage the engine and the planetary gear set;
the first clutch is actuated to engage the first electric machine and the planetary gear set,
the first electric machine is selected to operate as an electric motor, and
the second clutch is actuated to disengage the second electric machine and the planetary gear set,
whereby power may be transferred
from the engine to the differential gear set,
from the first electric machine to the differential gear set;

in a sixth mode of operation,
the engine clutch is actuated to engage the engine and the planetary gear set;
the first clutch is actuated to disengage the first electric machine and the planetary gear set,
the second clutch is actuated to disengage the second electric machine and the planetary gear set,
whereby power may be transferred
from the engine to the differential gear set;

in a seventh mode of operation,
the engine clutch is actuated to disengage the engine and the planetary gear set;
the first clutch is actuated to engage the first electric machine and the planetary gear set,
the first electric machine is selected to operate as an electric motor,
the second clutch is actuated to engage the second electric machine and the planetary gear set, and
the second electric machine is selected to operate as an electric motor,
whereby power may be transferred
from the first electric machine to the differential gear set, and
from the second electric machine to the differential gear set;

in an eighth mode of operation,
the engine clutch is actuated to disengage the engine and the planetary gear set;
the first clutch is actuated to disengage the first electric machine and the planetary gear set,
the second clutch is actuated to engage the second electric machine and the planetary gear set, and
the second electric machine is selected to operate as an electric motor,
whereby power may be transferred
from the second electric machine to the differential gear set;

in a ninth mode of operation,
the engine clutch is actuated to disengage the engine and the planetary gear set;
the first clutch is actuated to engage the first electric machine and the planetary gear set,
the first electric machine is selected to operate as an electric motor, and
the second clutch is actuated to disengage the second electric machine and the planetary gear set,
whereby power may be transferred
from the first electric machine to the differential gear set.

26. A vehicle powertrain system comprising:
a planetary gear set comprising:
a sun gear, a ring gear, and
a planetary carrier;
a differential gear set coupled to the planetary gear set;
an engine coupled to the ring gear to transfer power between the engine and the ring gear; and
a first electric machine coupled to the sun gear via a first clutch and selectively engagable, via actuation of the first clutch, to transfer power between the first electric machine and the sun gear;
wherein the first electric machine is selectively operable as either an electric motor or as an electric generator, and wherein:
in a first mode of operation,
the first clutch is actuated to engage the first electric machine and the sun gear, and
the first electric machine is selected to operate as an electric motor,
whereby power may be transferred
from the first electric machine to the engine via the differential gear set;
in a second mode of operation,
the first clutch is actuated to engage the first electric machine and the sun gear, and
the first electric machine is selected to operate as an electric motor,
whereby power may be transferred
from the engine to the differential gear set, and
from the first electric machine to the differential gear set; and
in a third mode of operation,
the first clutch is actuated to disengage the first electric machine and the sun gear,
whereby power may be transferred
from the engine to the differential gear set.

27. A vehicle powertrain system comprising:
a planetary gear set comprising:
a sun gear,
a ring gear, and
a planetary carrier;
a differential gear set coupled to the planetary gear set;
an engine coupled to the ring gear to transfer power between the engine and the ring gear; and
a first electric machine coupled to the sun gear via a first clutch and selectively engagable, via actuation of the first clutch, to transfer power between the first electric machine and the sun gear;
wherein the engine is coupled to the ring gear via an engine clutch, and wherein the engine is selectably engagable, via actuation of the engine clutch, to transfer power between the engine and the ring gear;
wherein the first electric machine is selectively operable as either an electric motor or as an electric generator, and wherein:
in a first mode of operation,
the engine clutch is actuated to engage the engine and the ring gear;
the first clutch is actuated to engage the first electric machine and the sun gear, and
the first electric machine is selected to operate as an electric motor,
whereby power may be transferred
from the first electric machine to the engine via the differential gear set;
in a second mode of operation,
the engine clutch is actuated to engage the engine and the ring gear;
the first clutch is actuated to engage the first electric machine and the sun gear, and
the first electric machine is selected to operate as an electric motor,
whereby power may be transferred
from the engine to the differential gear set,
from the first electric machine to the differential gear set;
in a third mode of operation,
the engine clutch is actuated to engage the engine and the ring gear; and
the first clutch is actuated to disengage the first electric machine and the sun gear,
whereby power may be transferred
from the engine to the differential gear set; and
in a fourth mode of operation,
the engine clutch is actuated to disengage the engine and the ring gear;
the first clutch is actuated to engage the first electric machine and the sun gear, and
the first electric machine is selected to operate as an electric motor,
whereby power may be transferred
from the first electric machine to the differential gear set.

\* \* \* \* \*